(12) United States Patent
Wong et al.

(10) Patent No.: US 10,177,881 B2
(45) Date of Patent: Jan. 8, 2019

(54) COMMUNICATIONS DEVICE, INFRASTRUCTURE EQUIPMENT, COMMUNICATIONS SYSTEM AND METHODS

(71) Applicant: Sony Corporation, Tokyo (JP)

(72) Inventors: Shin Horng Wong, Basingstoke (GB); Martin Warwick Beale, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 242 days.

(21) Appl. No.: 15/342,881

(22) Filed: Nov. 3, 2016

(65) Prior Publication Data

US 2018/0254860 A1    Sep. 6, 2018

Related U.S. Application Data

(63) Continuation-in-part of application No. PCT/EP2016/074605, filed on Oct. 13, 2016.

(30) Foreign Application Priority Data

Nov. 4, 2015  (EP) .................................... 15193082

(51) Int. Cl.
*H04W 4/00*    (2018.01)
*H04L 1/18*    (2006.01)
(Continued)

(52) U.S. Cl.
CPC .......... *H04L 1/1819* (2013.01); *H04L 1/1664* (2013.01); *H04L 1/1835* (2013.01); *H04L 5/0055* (2013.01); *H04W 72/0406* (2013.01)

(58) Field of Classification Search
CPC ... H04L 1/0003; H04L 1/0007; H04L 1/0016; H04L 5/1469; H04L 1/16; H04L 1/1812;
(Continued)

(56) References Cited

U.S. PATENT DOCUMENTS

| | | | |
|---|---|---|---|
| 9,319,196 B2 * | 4/2016 | Lee ..................... | H04L 5/0053 |
| 2013/0121216 A1 * | 5/2013 | Chen .................... | H04L 1/1835 |
| | | | 370/280 |

OTHER PUBLICATIONS

Harri Holma et al., LTE for UMTS: OFDMA and SC-FDMA Based Radio Access, Wiley 2009, ISBN 978-0-470-99401-6 (4 pages).
(Continued)

*Primary Examiner* — Frank Duong
(74) *Attorney, Agent, or Firm* — Xsensus LLP

(57) ABSTRACT

An infrastructure equipment of a wireless communications network is configured to transmit signals to one or more communications devices via a wireless access interface, and to receive signals from one or more of the communications devices via the wireless access interface. The wireless access interface provides communications resources arranged in time divided units of a carrier frequency bandwidth providing a plurality of blocks of communications resources, each of the time divided units comprising on a downlink of the wireless access interface a control channel for transmitting control channel messages and a shared channel, the control channel message allocating communications resources of the shared channel to the communications devices to receive the signals from the one or more infrastructure equipment. The infrastructure equipment is configured to transmit data, as a plurality of data units, to the one or more communications devices, each data unit being encoded for transmission in accordance with a repeat request-type process, the encoding providing an indication of whether the data has been received correctly by a communications device. Each of the data units is transmitted in one of a repeating number of consecutive time divided units according to a separately controlled repeat request-type process. The transmitter is configured to transmit a control message allocating resources of the shared channel for receiving a data unit of a repeat request-type process which is one or more time
(Continued)

divided units after a time divided unit in which the control message is transmitted, and the number of repeat request-type processes in the repeating pattern of time divided units is increased from a first number in the first mode to a second number in the second mode.

23 Claims, 13 Drawing Sheets

(51) Int. Cl.
*H04L 5/00* (2006.01)
*H04L 1/16* (2006.01)
*H04W 72/04* (2009.01)

(58) Field of Classification Search
CPC ... H04L 1/1819; H04L 1/1822; H04L 1/1825; H04L 1/1835; H04L 1/1854; H04L 1/1861; H04L 1/1864; H04L 1/1896; H04L 5/0055; H04L 5/14; H04W 28/06; H04W 72/04; H04W 72/0406; H04W 72/0413; H04W 72/1289
See application file for complete search history.

(56) References Cited

OTHER PUBLICATIONS

Report on informal email discussion [eMTC-5] on remaining PDSCH issues for Rel-13 eMTC, 3GPP TSG RAN WG1 Meeting #83, R1-157514, Anaheim, USA, Nov. 15-22, 2015.

\* cited by examiner

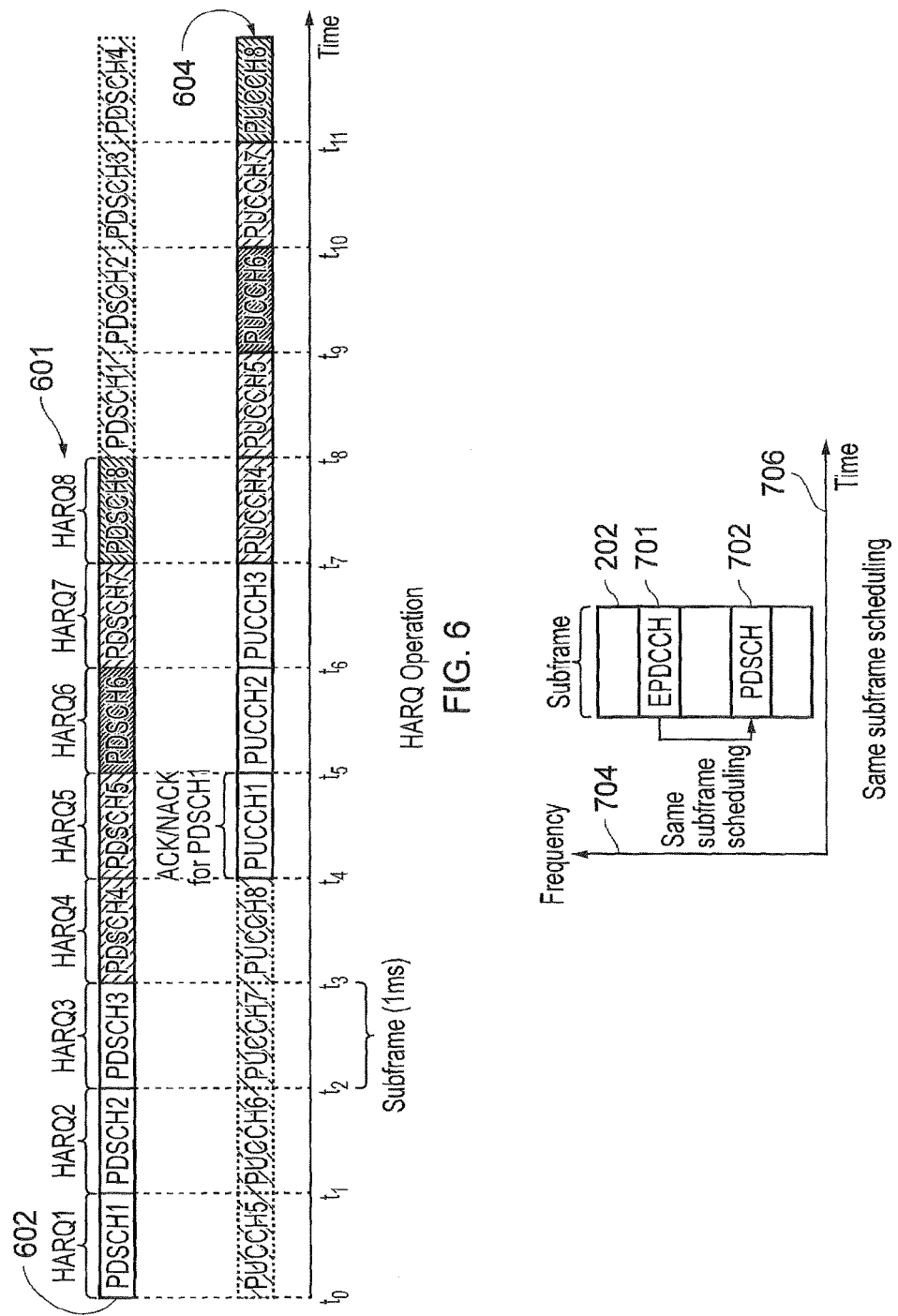

Cross-subframe scheduling

Scheduling gaps

Adding two more HARQ Processes

Signalling diagram for acknowledgement of HARQ Buffer Repartition Indication

PUSCH / PUCCH timing relative to M-PDCCH and PDSCH

Whole HARQ timeline from eNodeB perspective

PUCCH containing early PUCCH DMRS reference signals

PUCCH with shorter duration DMRS reference symbols

Locations of resource elements applied to UCI when piggybacked on PUSCH

COMMUNICATIONS DEVICE, INFRASTRUCTURE EQUIPMENT, COMMUNICATIONS SYSTEM AND METHODS

The present application claims priority to European Patent Application 15 193 082.3, filed in the European Patent Office on Nov. 4, 2015, the entire contents of which is hereby incorporated herein by reference in its entirety.

TECHNICAL FIELD

The present disclosure relates to communications devices configured to receive data from a wireless communications network. In some embodiments the wireless access interface is configured to communicate data in accordance with a plurality of repeat request-type processes. The present invention also relates to methods of communicating using communications devices, wireless communications network, infrastructure equipment and methods.

BACKGROUND

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will need to support communications to and from a much wider range of devices, including reduced complexity devices, machine type communication devices, devices which require little or no mobility, high resolution video displays and virtual reality headsets. For the example of low cost-communications devices it is desirable to employ techniques which can extend radio coverage using repeated transmission and so-called cross subframe scheduling in which a repeated transmission of a control message allocating communications resources of a shared channel is followed after a processing gap with a repeated transmission on the allocated shared channel. However such techniques may have an effect on other aspects such as a maximum data rate which can be achieved using repeat request-type processes.

SUMMARY

Embodiments of the present technique can provide an arrangement in which a communications device is configured to receive data from one or more infrastructure equipment as a plurality of data units, each data unit encoded for transmission in accordance with a repeat request-type protocol. The repeat request protocol may be for example an automatic repeat request protocol (ARQ) or a hybrid automatic repeat request (HARQ) protocol or any type of protocol, which includes transmitting a feedback acknowledgement (ACK) or a negative acknowledgement (NACK) from the receiving communications device. The encoding of the data units is to provide an indication of whether the data has been received correctly, the data units being received from the one or more infrastructure equipment in one of a repeating pattern of a first number of time divided units. Each data unit is received in one of the repeating pattern of data units according to a separately controlled repeat request type process. The communications device is configured to receive the control message allocating resources of the shared channel for receiving the data unit of the repeat request-type process which is one or more time divided units after a time divided unit in which control message is received, and the first number of repeat request-type processes and repeating consecutive time divided units is increased in the second mode to a second number.

According to the present technique when an infrastructure equipment is configured to transmit control channel messages allocating to communications resources of a shared channel which is one or more time units after the transmission of the control message allocating those resources (so called cross subframe scheduling) then the infrastructure equipment must wait for that corresponding number of subframes in order to start a next repetition of the repeating pattern of time divided units in which the repeat request-type processes are operating. According to the present technique the infrastructure equipment controls the communication device so that additional repeat request-type processes are scheduled in time divided units in which the infrastructure equipment would have to wait until beginning the next repetition of repeat request-type processes. Accordingly, communication resources can be used more efficiently and moreover the wireless communications network can achieve the same maximum downlink data bandwidth with cross subframe scheduling as that which can be achieved without.

In other embodiments the infrastructure equipment signals to the communications device that the number of repeat request-type processes has been increased from the first number to the second number. In response the communications device is configured to repartition a buffer allocated for receiving data units from the repeat request-type processes in accordance with the increased number of repeated consecutive time divided units corresponding to the number of repeat requests-type processes employed by the infrastructure equipment.

Embodiments of the present technique according to another aspect can provide an arrangement in which a communications device is configured to adapt at least one of the decoding of encoded data units, the reception of the encoded data units or the transmission of acknowledgements or negative acknowledgements of the repeat request-type processes for received the encoded data units to reduce a time for transmission of the data unit in accordance with a time between the reception of the control message allocating the communications resources on the shared channel and the communications resources of the shared channel, when cross subframe scheduling is used. Corresponding adaptions can be applied to the infrastructure equipment.

Various further aspects and embodiments of the disclosure are provided in the appended claims, including but not limited to, a communications device, infrastructure equipment, mobile communications system and a method of communicating.

BRIEF DESCRIPTION OF DRAWINGS

Embodiments of the present disclosure will now be described by way of example only with reference to the accompanying drawings in which like parts are provided with corresponding reference numerals and in which:

FIG. 6 is a schematic illustration of arrangements of subframes for both the uplink and the downlink in which a maximum number of HARQ processes are configured by an infrastructure equipment to provide a maximum bandwidth to a communications device;

FIG. 7 is a graphical illustration of a plot frequency against time illustrating transmission within a subframe in which an EPDCCH is allocating resources in the same subframe of the PDSCH;

DESCRIPTION OF EXAMPLE EMBODIMENTS

Conventional LTE Network

Figure 1:
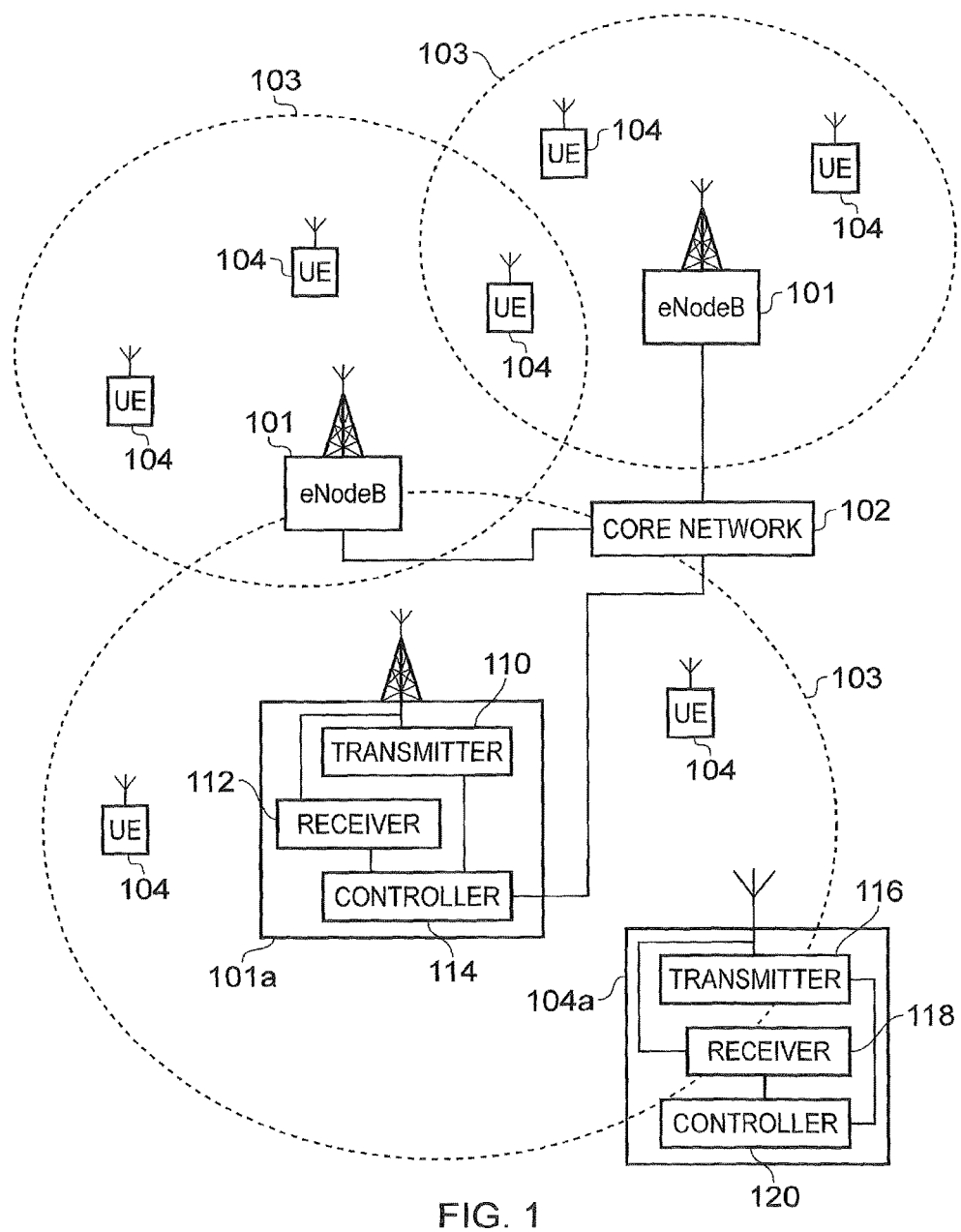
FIG. 1 provides a schematic diagram illustrating an example of a conventional mobile communications system.

FIG. 1 provides a schematic diagram illustrating some basic functionality of a mobile telecommunications network/system operating in accordance with LTE principles. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

The mobile telecommunications system, where the system shown in FIG. 1 includes infrastructure equipment comprising base stations 101 which are connected to a core network 102, which operates in accordance with a conventional arrangement which will be understood by those acquainted with communications technology. The infrastructure equipment 101 may also be referred to as a base station, network element, enhanced NodeB (eNodeB (eNB)) or a coordinating entity for example, and provides a wireless access interface to the one or more communications devices within a coverage area or cell represented by a broken line 103. One or more mobile communications devices 104 may communicate data via the transmission and reception of signals representing data using the wireless access interface. The core network 102 may also provide functionality including authentication, mobility management, charging and so on for the communications devices served by the network entity.

The mobile communications devices of FIG. 1 may also be referred to as communications terminals, user equipment (UE), terminal devices and so forth, and are configured to communicate with one or more other communications devices served by the same or a different coverage area via the network entity. These communications may be performed by transmitting and receiving signals representing data using the wireless access interface over the two way communications links.

As shown in FIG. 1, one of the eNodeBs 101a is shown in more detail to include a transmitter 110 for transmitting signals via a wireless access interface to the one or more communications devices or UEs 104, and a receiver 112 to receive signals from the one or more UEs within the coverage area 103. A controller 114 controls the transmitter 110 and the receiver 112 to transmit and receive the signals via the wireless access interface. The controller 114 may perform a function of controlling the allocation of communications resource elements of the wireless access interface and may in some examples include a scheduler for scheduling transmissions via the wireless access interface for both an uplink and a downlink.

An example UE 104a is shown in more detail to include a transmitter 116 for transmitting signals on the uplink of the wireless access interface to the eNodeB 101 and a receiver 118 for receiving signals transmitted by the eNodeB 101 on the downlink via the wireless access interface. The transmitter 116 and the receiver 118 are controlled by a controller 120.

LTE Wireless Access Interface

Mobile telecommunications systems such as those arranged in accordance with the 3GPP defined Long Term Evolution (LTE) architecture use an orthogonal frequency division modulation (OFDM) based wireless access interface for the radio downlink (so-called OFDMA) and a single carrier frequency division multiple access scheme (SC-FDMA) on the radio uplink. The down-link and the up-link of a wireless access interface according to an LTE standard is presented in FIGS. 2 and 3.

Figure 2:
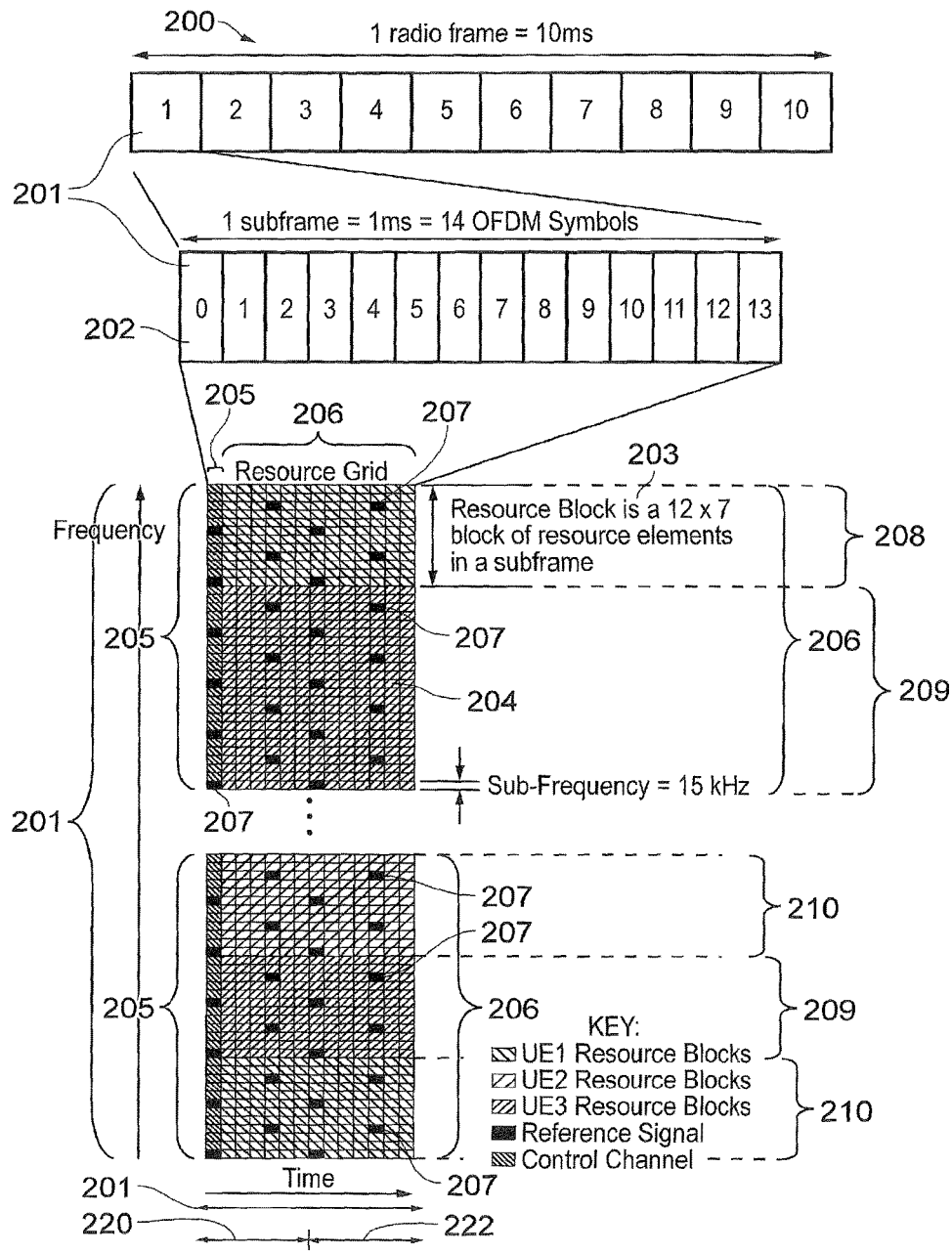
FIG. 2 provides a schematic diagram of a structure of a downlink of a wireless access interface of a mobile communications system operating according to an LTE standard.

FIG. 2 provides a simplified schematic diagram of the structure of a downlink of a wireless access interface that may be provided by or in association with the eNodeB of FIG. 1 when the communications system is operating in accordance with the LTE standard. In LTE systems the wireless access interface of the downlink from an eNodeB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHZ and 20 MHz bandwidth may be divided into orthogonal subcarriers. Not all of these subcarriers are used to transmit data (some are used for features such as the cyclic prefix of the OFDM symbols). The number of subcarriers varies between 72 subcarriers (1.4 MHz) and 1200 subcarriers (20 MHz). In some examples the subcarriers are grouped on a basis of $2^n$, for example 128 to 2048, so that both a transmitter and a receiver can use an inverse and a forward Fast Fourier Transform to convert the sub-carriers from the frequency domain to the time domain and from the time domain to the frequency domain respectively. Each subcarrier bandwidth may take any value but in LTE it is fixed at 15 kHz.

As shown in FIG. 2, the resources of the wireless access interface are also temporally divided into frames where a frame 200 lasts 10 ms and is subdivided into 10 sub-frames 201 each within a duration of 1 ms. Each sub-frame 201 is formed from 14 OFDM symbols and is divided into two slots 220, 222 each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. The resource elements distributed in time within a sub-frame and frequency across the host system band width represent the communications resources of the host system.

The simplified structure of the downlink of an LTE wireless access interface presented in FIG. 2, also includes an illustration of each sub-frame 201, which comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel (PDCCH), a physical control format indicator channel (PC-FICH) and a physical HARQ indicator channel (PHICH). The data region may contain a number of physical channels for the transmission of data or control, such as a physical downlink shared channel (PDSCH), enhanced physical downlink control channel (ePDCCH) and a physical broadcast channel (PBCH). Although these physical channels provide a wide range of functionality to LTE systems, in terms of resource allocation and the present disclosure ePDCCH and PDSCH are most relevant. Further information on the structure and functioning of the physical channels of LTE systems can be found in [1].

Figure 3:
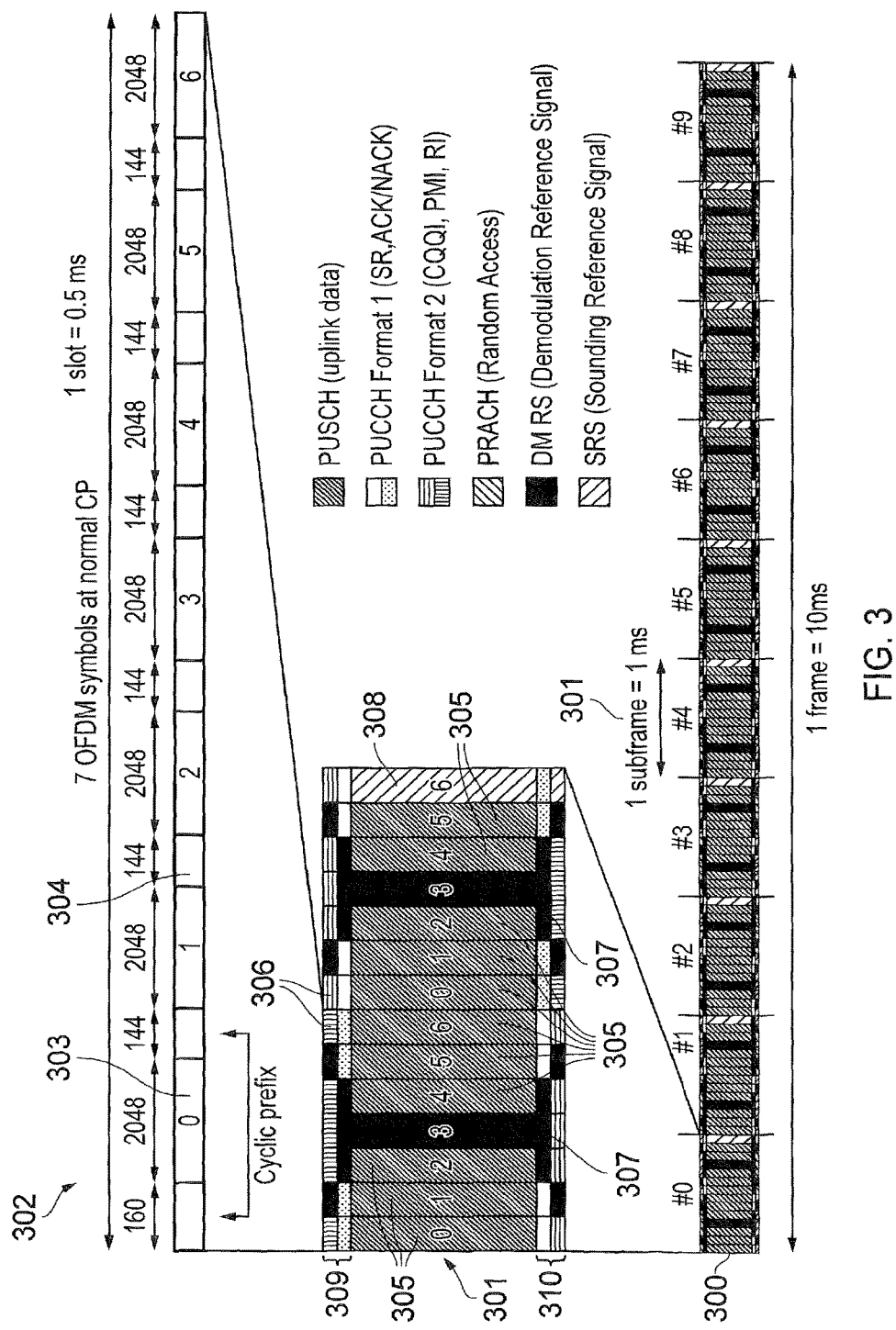
FIG. 3 provides a schematic diagram of an uplink of a wireless access interface of a mobile communications system operating according to an LTE standard.

Resources within the PDSCH may be allocated by an eNodeB to UEs being served by the eNodeB. For example, a number of resource blocks of the PDSCH may be allocated to a UE in order that it may receive data that it had previously requested or data which is being pushed to it by the eNodeB, such as radio resource control (RRC) signalling. In FIG. 3, UE1 has been allocated resources 208 of the data region 206, UE2 resources 209 and UE3 resources 210. UEs in an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resource elements, resource control information specifying downlink resource allocations is conveyed across the PDCCH in a form termed downlink control information (DCI), where resource allocations for a PDSCH are communicated in a preceding PDCCH instance in the same sub-frame.

Figure 4:
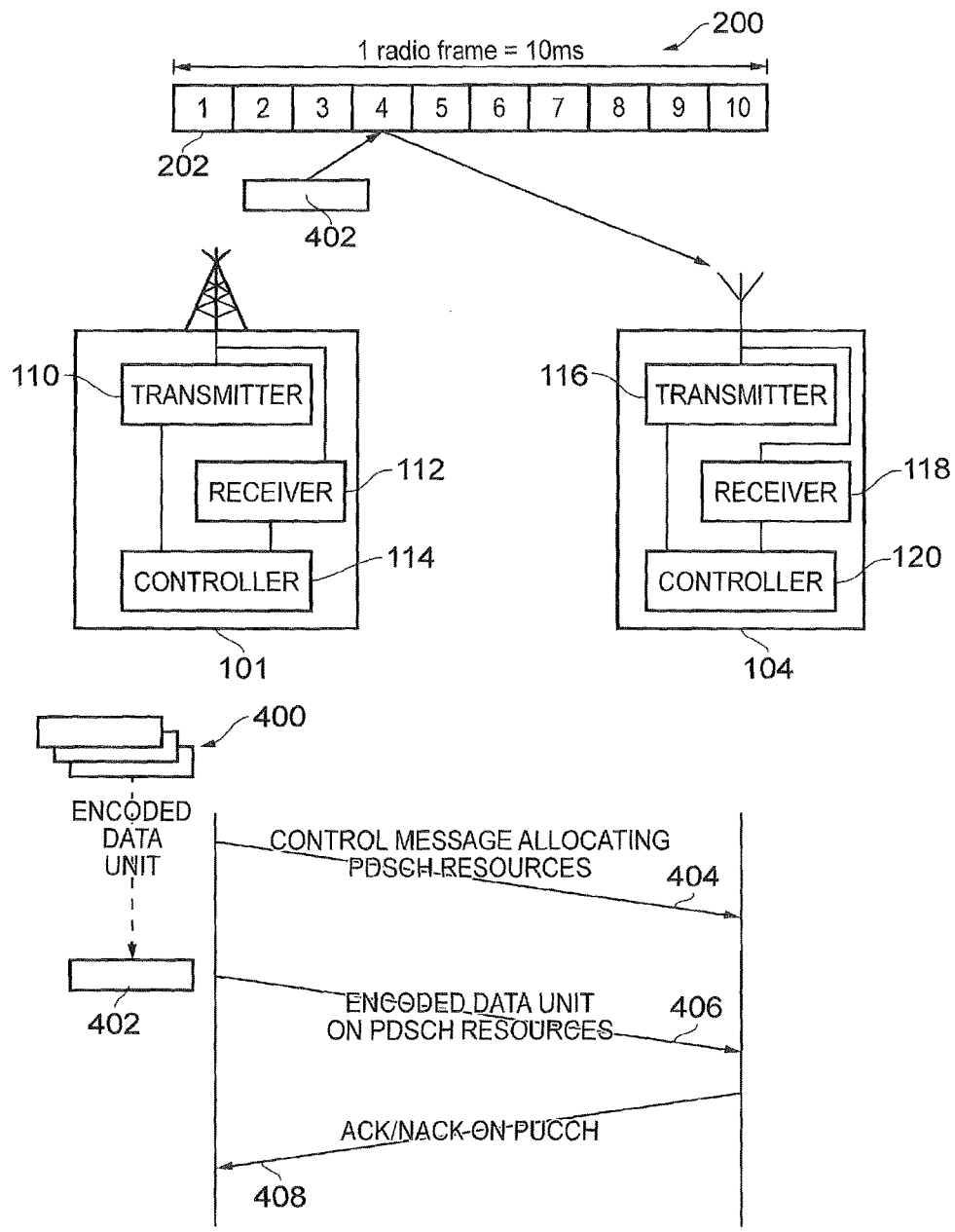
FIG. 4 provides a part block schematic diagram part process flow diagram illustrating an example of a hybrid automatic repeat request protocol (HARQ) process in which data is transmitted as a plurality of data units or transport blocks in a plurality of frames from a base station (eNB) to a communications device (UE)

FIG. 3 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations sub-frames switch between uplink and downlink sub-frames in accordance with predefined patterns. However, regardless of the form of duplexing used, a common uplink frame structure is utilised. The simplified structure of FIG. 4 illustrates such an uplink frame in an FDD implementation. A frame 300 is divided in to 10 sub-frames 301 of 1 ms duration where each sub-frame 301 comprises two slots 302 of 0.5 ms duration. Each slot is then formed from seven OFDM symbols 303 where a cyclic prefix 304 is inserted between each symbol in a manner equivalent to that in downlink sub-frames. More details of the LTE up-link represented in FIG. 3 are provided in Annex 1.

Hybrid Automatic Repeat Request Protocol (HARQ)

Those acquainted with LTE will know that communications devices can be configured to transmit data using a hybrid automatic repeat request (HARQ) technique. As those familiar with HARQ will appreciate, data is transmitted using an HARQ technique by dividing the data into data units and encoding each data unit using a forward error correction code introducing redundant data into a resulting encoded data unit. The data may also be encoded to provide a separate parity check reference. Once the data has been transmitted from a transmitter to a receiver, the encoded data unit is decoded at the receiver, and the cyclic redundancy check is recalculated. If the cyclic redundancy check fails, then the data unit is concluded as being received in error. A negative acknowledgement (NACK) is transmitted, by the receiver or destination device to the transmitter device, which then either retransmits the encoded data unit or transmits more of the redundant data, which has been calculated for the encoded data unit. However, if the encoded data unit has been decoded successfully at the receiver then an acknowledgement (ACK) is transmitted to the transmitter. The transmitter can then transmit the next encoded data unit. In accordance with a conventional LTE arrangement, when a communications device is transmitting and receiving data via a base station or eNodeB, the ACK/NACK signals are transmitted as part of or piggybacked on to other control signals thereby making efficient use of the available communications resources. For LTE systems the data unit or transport block is carried on the downlink by the Physical Downlink Shared Channel (PDSCH).

FIG. 4 provides a part schematic block diagram, part flow diagram illustrating an example of a HARQ process according to a known arrangement within LTE Standards. FIG. 4 provides an example in which data is transmitted from an eNB 101 to a UE 104 using a single sub-frame 202 in each frame 200. As such, FIG. 4 represents an example of a single HARQ process. As shown in FIG. 4, data is received by the eNB 101 and formed into a plurality of data units or transport blocks 400. The controller 114 then controls the receiver 112 to encode the transport blocks into encoded data units for transmission to the UE 104 via the wireless access interface. As shown pictorially above the eNB 101 and UE 104, for this example, the encoded data unit 402 is transmitted in sub-frame 4 of the frame 200.

In accordance with the LTE standard, in order to transmit the encoded data unit 402 in the sub-frame 4, the eNB transmits a control channel message in the PDCCH of the sub-frame 4 in which the control channel message indicates the resources of the PDSCH on which the encoded data 402 will be transmitted. The UE 104 under the control of the controller 114 controls the receiver 112 to detect the control message 404, which indicates the communications resources of the PDSCH in which the encoded data unit 402 is to be transmitted. The encoded data unit 402 is then transmitted 406 by the eNB 101 on those PDSCH resources and detected by the receiver 118 in the UE 104.

The receiver 118 within the UE 104 then attempts to decode the transport block. As will be appreciated there are various forms of repeat request protocols, some of which request retransmission of the entire encoded data unit whereas others request retransmission of the redundant data provided by forward error correction. The controller 120 controls the transmitter 116 to transmit an acknowledgement (ACK) or a negative acknowledgement (NACK) on the PUCCH 408 in accordance with whether or not the receiver was able to successfully decode the encoded data unit 402. According to the repeat request protocol, the eNB 101 then reschedules transmission of the encoded data unit 402 or transmits more redundant data in order that the receiver 118 in the UE 104 can recover the data unit 402.

Figure 5:
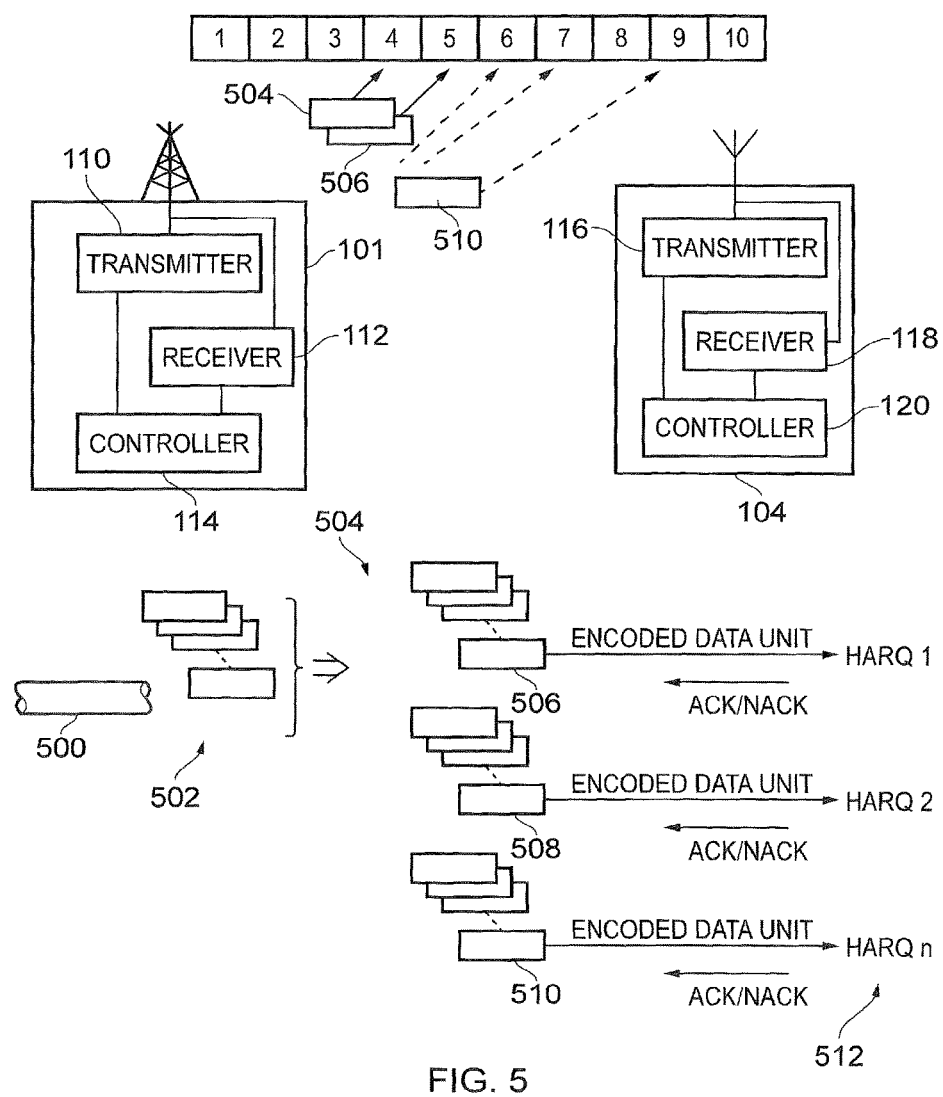
FIG. 5 provides a part schematic HARQ illustrative flow diagram illustrating an arrangement in which a plurality of HARQ processes are used by the eNB to transmit data to a communications device.

As explained above, the illustrative arrangement shown in FIG. 4 represents the transmission of a single HARQ process in which one of the sub-frames in each frame is used to transmit a data unit (transport block). However, in accordance with conventional LTE specifications, the wireless communications may provide an increased bandwidth to the UE 104 by utilising more of the sub-frames 202 within each frame 200 to transmit the data. Such an arrangement is shown in FIG. 5. In FIG. 5, an example is shown in which a plurality of HARQ processes are active for transmission of data from the communications network to the UE 104.

As shown in FIG. 5 data is received on a transmission pipe 500. The data is then divided into transport blocks or data units 502 and multiplexed into a plurality of separate transport streams 504. Each stream 504 is then allocated to a separate HARQ process so that as shown in FIG. 5, HARQ process 1 transmits each encoded data unit in sub-frame 4, HARQ process 2 transmits an encoded data unit on sub-frame 5. There may be other HARQ processes transmitting data units in different sub-frames indicated as HARQn. Accordingly, the UE 104 may receive an increased downlink bandwidth in accordance with the number of HARQ processes deployed by the eNB for transmission in separate sub-frames of the transmission frame 200.

FIG. 6 illustrates an example in which a maximum number of HARQ processes are used to transmit data on the downlink from the eNB 101 to the UE 104 using the PDSCH. PDSCH1 is received by the UE at time $t_0$ in which the UE stores the received data unit in a HARQ buffer in the receiver. Four subframes later, i.e. at time $t_4$, the UE sends a HARQ feedback (carried by PUCCH1) to the eNB indicating whether it has received PDSCH1 successfully. If the UE sends a NACK, the eNB would retransmit the data unit in PDSCH1 to the UE in the next available time period for HARQ Process 1, i.e. at time $t_8$. The UE would combine the retransmitted data unit received on PDSCH1 to that already in the HARQ1 buffer. There would be a maximum number of retransmissions after which the transmission is considered failed if the UE still has not received it. Upon receiving the PUCCH containing the HARQ feedback (ACK) for a HARQ Process (HARQ1), the eNB would need to process the PUCCH and then construct the PDSCH (a retransmission or a new packet) for the following HARQ1. According to the example of LTE, the eNB is allowed to take three subframes to perform this processing. Hence the entire round trip for a HARQ Process is eight subframes.

As shown in FIG. 6, as a result of the processing and transmission delays within the HARQ processes, there are a maximum number of HARQ processes, which can be accommodated according to a conventional operation of the LTE Standard. According to this arrangement there are a maximum of eight HARQ processes 601. As shown in FIG. 6 the eNB 101 therefore schedules eight transmissions on the PDSCH 602 to the UE 104. Correspondingly, the UE transmits an ACK/NACK 604 in accordance with the HARQ process on the PUCCH corresponding to the transmission of the encoded data unit on the PDSCH for the HARQ process to which the data unit corresponds.

Generally, repeat request-type protocols are Stop And Wait processes in which the eNB 101 needs to wait for another eight subframes before it can use the same HARQ process to send another data unit on PDSCH of the subframe of the repeating consecutive sub-frames. This is either a retransmission or a new data unit as explained above. Whilst waiting to reuse the same HARQ Process, e.g. HARQ1, the eNB 101 can continue to send (different) data units on the PDSCH to the UE 104 using additional HARQ Processes, e.g. HARQ2 to HARQ8. In this way, the eNB can transmit data units to the UE 104 in consecutive subframes, as shown in FIG. 6, thereby maximising throughput. It should be appreciated that each HARQ Process requires buffer (memory) to store/accumulate a data unit for transmission on the PDSCH. In the legacy system there is a maximum of eight downlink HARQ processes and hence the entire HARQ buffer memory needs to be sufficient to store eight times the largest data unit size transmitted on the PDSCH. According to one example, the encoding applied to the data unit (transport block) as part of the HARQ process may be ⅓ rate so that the number of soft physical bits supported by each HARQ process is approximately three times the size of the largest transport block size supported, based on the mother code rate of the LTE Turbo code being ⅓.

It should be appreciated that in LTE the downlink uses an asynchronous HARQ where the eNB can decide when each HARQ process occurs. That is, HARQ Process 2 does not need to occur immediately after HARQ Process 1 as shown in FIG. 6 but some delay (up to eNB) can occur between two HARQ Processes. However, the round trip time of a single HARQ Process (i.e. sending control, data and acknowledgement and the processing time) remains the same (i.e. 8 subframes). In FIG. 6 the HARQ Processes occur consecutively in order to achieve peak throughput since any gaps would lead to a decrease from the peak throughput.

Supporting Low Cost-MTC UEs

It has been proposed to provide a configuration of the communications resources of the wireless access interface to support a category of devices known as low cost (LC) machine-type communications (MTC) devices (LC-MTC UEs). In addition to limiting the carrier frequency bandwidth to six physical resource blocks (PRBs), another complexity reduction feature may be to limit the size of the data unit (transport block size) of the LC-MTC UE in the downlink and uplink to 1000 bits, i.e. limiting the potential throughput to 1 Mbps. Reducing the transport block size to 1000 bits can directly reduce the amount of memory required for the HARQ buffer thereby reducing the cost. According to the above illustration, with a maximum number of HARQ processes limited to eight and accordingly the HARQ buffer memory is arranged to support a maximum number of eight HARQ processes for LC-MTC UE.

One of the technical challenges for LC-MTC UE is to achieve coverage enhancement, low complexity (i.e., low cost) and reduced power consumption. In the coverage enhancement (CE) feature, the coverage for LC-MTC is extended by 15 dB (relative to that of conventional UEs). The main technique for CE is via numerous repetitions of the same message. The main technique to reduce complexity/cost for LC-MTC UE is to restrict the UE to operate within six PRBs. The system bandwidth is therefore divided into multiple 6 PRBs narrowbands and the LC-MTC UE is expected to be able to tune into any of these narrowbands.

Figure 8:
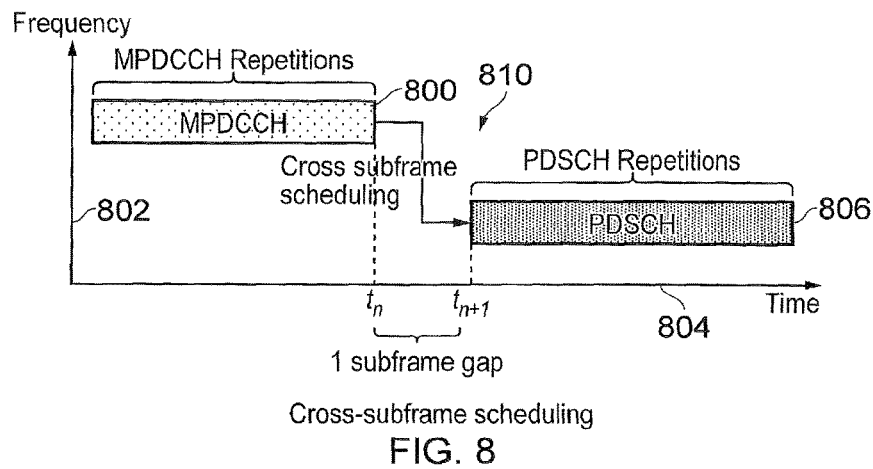
FIG. 8 is a graphical illustration of a plot of frequency resources with respect to time illustrating an arrangement corresponding with that shown in FIG. 7 in which cross subframe scheduling is arranged so that there is a delay between the transmission of on an MPDCCH and a PDSCH.

To transmit downlink data to a UE, the eNB firstly sends a DCI which is carried by PDCCH or EPDCCH (M-PDCCH for LC-MTC) containing downlink grant (scheduling information for a PDSCH, e.g. the MCS (modulation and coding scheme), number of PRBs). This is followed by a PDSCH carrying the downlink data. In conventional systems, a control message allocating the resources of the shared channel (PDCCH) is transmitted on the control channel (PDCCH/EPDCCH) in the same subframe in which the PDSCH and EPDCCH are transmitted. This conventional arrangement is illustrated in FIG. 7, in which according to this conventional arrangement, the transmission of a control message on an EPDCCH allocates resources of the PDSCH in the same sub-frame in which it is transmitted. In contrast, FIG. 8 shows so called "cross sub-frame scheduling", which has been proposed for LC-MTC UEs. Cross sub-frame scheduling is provided to allow low power or low cost communications devices to receive control channel messages, which are known as DCI messages on an MPDCCH by repeated transmission to receive and recover data at lower signal to noise ratios by also repeated transmission of the data on the PDSCH. The transmission of the control channel messages is arranged repeatedly on the downlink in the MPDCCH as illustrated in FIG. 8 within block 800. Correspondingly, perhaps in a different frequency as illustrated by the time and frequency axes 802, 804 data is transmitted repeatedly on the PDSCH resources, which are indicated by the control message provided on the MPDCCH 806. However, to allow a low cost or low capability communications device to process the control channel message from the MPDCCH to determine the (frequency) location of the PDSCH and possibly to retune to the frequency resource where the data transmitted on the PDSCH is scheduled, there is provided a delay of, for example, one sub-frame 810 between the transmission of the control channel message on the MPDCCH and the transmission on the allocated resources on the PDSCH. In one example as illustrated in FIG. 8, the delay is equal to 1 sub-frame 810.

Cross-subframe scheduling is used due to the limited six PRB bandwidth and the need for repetitions in coverage enhanced operations. The six PRB bandwidth limits the number of frequency resources that can be used for both MPDCCH and PDSCH transmissions. Using more frequency resource would reduce the number of repetitions (resource in time), which is beneficial for power consumption in coverage enhanced operation. Cross-subframe scheduling allows the MPDCCH and PDSCH to fully occupy the frequency resource (six PRBs).

As will be appreciated, in order to reduce productions costs and system implementation it is desirable to have, as far as possible, a common design between normal coverage and coverage enhanced operation, which utilises repetition to transmit data at low signal to noise ratios or to LC-MTC UEs. Hence, even in operation without repetition, cross-subframe scheduling is also used. However, using cross-subframe scheduling in the non-repetitive case can have additional ramifications on the physical layer communications.

Figure 9:
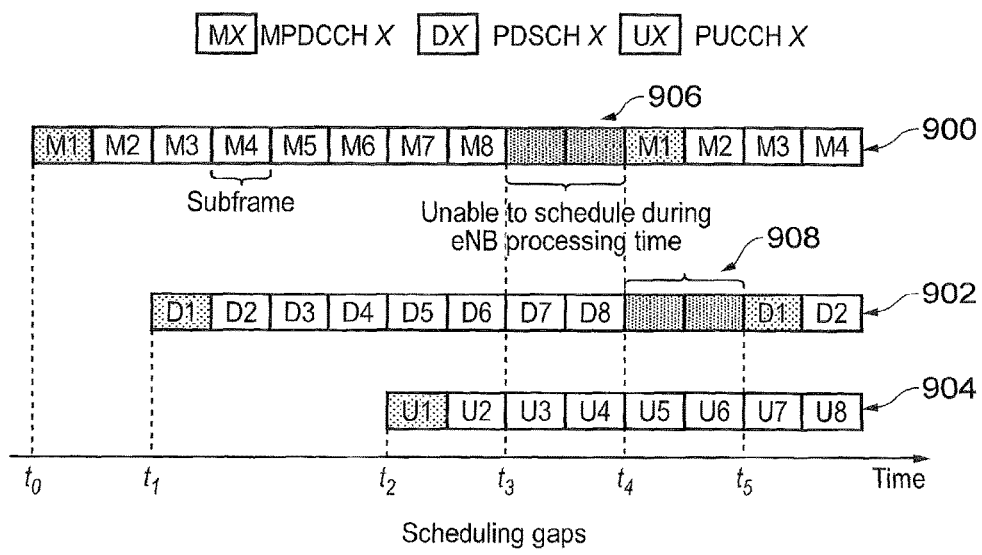
FIG. 9 is a schematic illustration of a transmission of resources in which a maximum number of HARQ processes are deployed with cross subframe scheduling introducing a temporal break between a transmission by a last of the HARQ processes and a first of the HARQ processes in repeating consecutive frames.

A schematic illustration of the transmission of data to, for example, an LC-MTC UE using cross sub-frame scheduling is shown in FIG. 9. As shown in FIG. 9 the transmission by the eNB 101 of the control messages (DCI messages) allocating resources of the PDSCH for transmission of the downlink data units is illustrated by a first line of boxes 900 in which each box is designated Mx where x is equal to 1 to 8, in accordance with the maximum data rate. Thus in accordance with a conventional arrangement eight possible HARQ processes determines the maximum data rate and so in accordance with that maximum data rate, eight control channel messages are transmitted on the MPDCCH to the UE allocating resources on the PDSCH. Correspondingly, the PDSCH is shown as a line of boxes 902 in which the transmission of the encoded data units Dx is shown in each box where x is equal to 1 to 8 in correspondence with the control channel messages transmitted on the MPDCCH. In accordance with a HARQ process explained above, each of the HARQ processes which is transmitting data units in the PDSCH in boxes Dx is provided with a feedback message ACK/NACK transmitted on the uplink in the PUCCH by the UE. The feedback messages transmitted on the uplink PUCCH are illustrated by a series of boxes 904. In correspondence with the other part of the HARQ processes shown in FIG. 9, the feedback message transmitted on the uplink PUCCH is indicated by each box Ux represents one of the x=1-8 feedback messages in accordance with the HARQ process.

As illustrated in FIG. 9, as a result of the use of cross sub-frame scheduling and with only eight HARQ processes, the eNB is unable to schedule every subframe with a transmission of a data unit of the PDSCH in successive sub-frames. As a result there is a break of two sub-frames between the transmission of the control channel message for the last HARQ process and the first HARQ process of the next repetition of consecutive sub-frames. Correspondingly, there is a break of two subframes in the transmission of data units on the PDSCH from the last HARQ process and the first HARQ process of the next repetition of the consecutive sub-frames. As a result, the eNB is unable to achieve a peak throughput (of 1 Mbps). As shown in FIG. 9 and explained above, an MPDCCH (M1) is received by the LC-MTC UE at time $t_0$ which schedules a PDSCH (D1) two subframes later at time $t_1$ for the HARQ Process 1. This is followed by UE transmitting a PUCCH carrying the HARQ feedback (ACK/NACK) four subframes later at time $t_2$. The HARQ feedback could alternatively be transmitted using a PUSCH. Since the eNB takes three subframes to process the PUCCH and construct a PDSCH, the next scheduling opportunity for HARQ Process 1 is at time $t_4$. As shown in FIG. 9, during the eNB processing time, there is a scheduling gap 906 (where no scheduling is made) for two subframes between time $t_3$ and $t_4$ since there are no more HARQ Processes available. Hence, only 8 out of 10 subframes can be scheduled with PDSCH which reduces the potential throughput from 1 Mbps to 800 kbps.

It should be observed that the M-PDCCH does not need to use all of the six PRBs within the narrowband. Unused PRBs can be used to support PDSCH. Hence PDSCH and M-PDCCH can be assigned to a UE in every subframe. In this mode of operation, the M-PDCCH in subframe 'n−2' would allocate PDSCH in subframe 'n' and the M-PDCCH in subframe 'n' would allocate PDSCH in subframe 'n+2'. This is illustrated in FIG. 9 where M-PDCCH M3 and PDSCH D1 occupy the same subframe, but PDSCH D1 was scheduled two subframes beforehand by M-PDCCH M1.

As shown in FIG. 9 if subframe scheduling is used in which the control channel message allocating resources of the PUCCH is sent in the subframe earlier than the allocation of communications resources, then there must be a gap between the transmission of the last data units and the first data unit of the corresponding repetition. That is to say, if the control channel message allocates resources of the shared channel in a subframe which is one or more subframes after subframe in which that controlled channel message is transmitted, which is the case with cross subframe scheduling, then there will be a corresponding delay in the eNB receiving the ACK/NACK from the UE which is equal to the number of subframes between the transmission of a control channel message and the shared resources which are allocated in a subframe by that message. Accordingly, there will have to be a break in the transmission of the data on the download which will therefore reduce the possible bandwidth which could be allocated to the UE.

Figure 10:
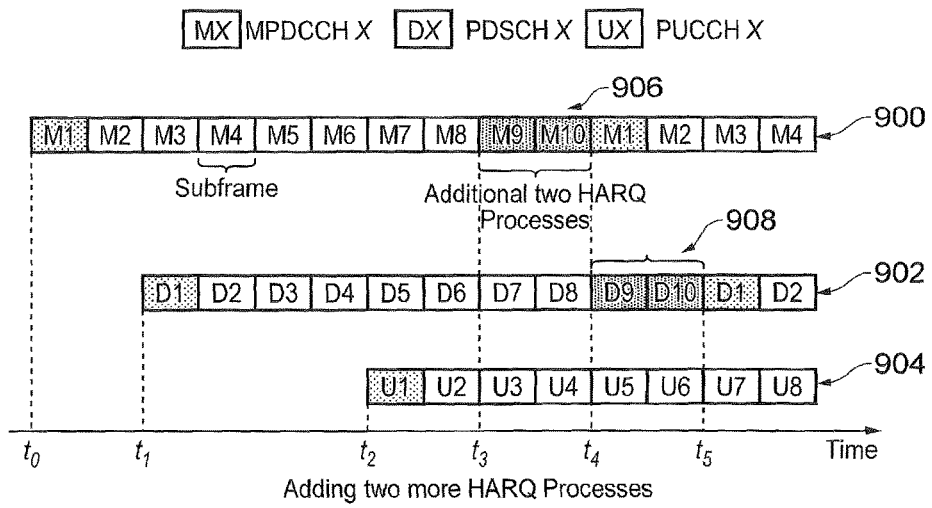
FIG. 10 is a schematic illustration of the transmission of resources on a plurality of HARQ processes corresponding to that shown in FIG. 9 but arranged in accordance with the present technique to increase the number of subframes used where there is break between the transmission of the last HARQ process and the first HARQ process in repeating consecutive frames.

According to example embodiments of the present technique, in order to compensate for the use of the cross sub-frame scheduling and to be able to achieve the same peak data rate which can be achieved in a mode which does not use the cross sub-frame scheduling, the eNB is configured to increase the number of HARQ processes and the repeated consecutive sub-frames which are for transmitting the different HARQ processes in accordance with the number of sub-frames separating the control message from the resources allocated by the control message. FIG. 10 provides an illustration of an arrangement corresponding to that shown in FIG. 9 but that adapted in accordance with the present technique to accommodate the subframes in which the eNB currently cannot schedule transmissions as a result of the cross subframe scheduling. Accordingly, peak throughput can be achieved and eNB processing time of receiving PUCCH (HARQ feedback) maintained by increasing the number of HARQ processes. For the example shown in FIGS. 9 and 10, two additional HARQ Processes, i.e. HARQ Process 9 and HARQ Process 10 are used to enable the eNB to schedule within the time $t_3$ and $t_4$ and transmit the corresponding PDSCH D9 and D10 between time $t_4$ and $t_5$. In this way all the subframes are occupied thereby achieving the peak throughput of 1 Mbps.

According to the present technique as shown in FIG. 10 where cross subframe scheduling is used in which case there is a gap between the transmission of the control channel allocating communication resources in a later subframe then eNS is configured to arrange other HARQ processes to be performed within the subframes corresponding to that gap. Accordingly, the number of HARQ processes then increases beyond the number which is the maximum configured for a conventional UE. Therefore, when transmitting to a UE a break in subframes between the last transmission by the last HARQ process in the first transmission by the first HARQ process can be utilised by other HARQ processes. Accordingly, corresponding utilisation of the communications resources available can be improved and a low cost UE can achieve the same maximum data rate as a conventional UE.

Increasing the number of HARQ Processes to ten would mean increasing the HARQ buffer memory in the UE, which would increase UE complexity (and cost). Furthermore a conventional communications device is only required to have a HARQ buffer memory size to support eight HARQ processes. According to example embodiments of the present technique therefore, the eNB may indicate to the UE to repartition its HARQ buffer memory for eight HARQ processes in a first mode and to repartition the HARQ buffer memory for ten HARQ processes in a second mode.

In one example a data unit is encoded in accordance with the HARQ process by encoding the data unit (transport block for transmission) for transmission in a PDSCH using a turbo code. In this process, additional coding bits are added to the information bits to make it more robust. Typically, a ⅓ code rate is applied to the information bits, i.e. the number of coded bits is three times that of the information bits. The HARQ buffer memory is designed assuming a ⅓ code rate is used on the information bits of the largest data unit (transport block) size. Accordingly, embodiments of the present technique recognise that typically when a UE can achieve peak throughput, it is in a favourable radio condition and hence the UE can tolerate a higher coding rate. Hence, when the UE is in a favourable radio condition the code rate can be increased for example to ½ code rate instead of a ⅓ code rate resulting in less HARQ buffer memory per HARQ Process. Therefore, the amount of memory required for 8 HARQ Processes at ⅓ code rate can be repartitioned for ten HARQ processes at ½ code rate (using only ⅚ or 83% of the total HARQ buffer). Hence this allows the maximum number of HARQ Processes to increase without increasing the total HARQ buffer memory.

The eNB can send an indication to the UE, when the UE's radio condition is capable of tolerating a higher code rate of ½ with a large data unit. The eNB can use measurement reports or CSI (CQI) reports from the UE to make this decision. Such an indicator is only used when the UE is in normal coverage without repetition.

Similarly the eNB can indicate to the UE to repartition its HARQ buffer memory for eight HARQ processes (instead of ten HARQ processes) if the radio conditions deteriorate and are no longer able to support a ½ coding rate.

In one embodiment the indication is sent in a DCI carried by the MPDCCH. It should be appreciated that the DCI is typically used to indicate dynamic parameters to the UE, which would affect a single scheduling, for the case of normal coverage without repetition this would only affect a single subframe (containing the PDSCH). However, in this case, this DCI indication would affect at least ten schedules (10 PDSCH subframes) since it is not beneficial to change the number of HARQ Processes before all HARQ Processes have been utilised. The UE may likely require some time to repartition the HARQ buffer memory and hence, a delay needs to be included after the DCI indication before an MPDCCH can be sent to schedule the UE. This indication requires only a single bit in the DCI.

In another embodiment, the DCI bit indication can be a bit string in the "HARQ Process Number" field in the DCI. The HARQ Process Number in the DCI tells the UE which HARQ Process the corresponding scheduled PDSCH belongs to. Currently only three bits (for eight HARQ Processes) are used. An additional bit can be added to this field to support ten HARQ Processes and a special bit string e.g. "1111" (which indicates an invalid HARQ Process) can be used to indicate an increase to the number of HARQ Processes from eight to ten. A different bit string e.g. "1100" (i.e. does not correspond to any of the 10 HARQ Processes) can be used to indicate to reduce the number of HARQ processes from ten to eight.

In another embodiment, an implicit indication in the DCI may be made where the UE will use a smaller soft buffer for the PDSCH reception if the HARQ Process Number is greater than 8. Here, if the eNB indicates a HARQ Process Number>8, all subsequent HARQ Processes would use a smaller soft buffer, i.e. the PDSCH is rate matched to a smaller soft buffer. For example, the eNB may allocate HARQ Process Numbers 3, 9, 1, 2 & 4. HARQ Process Number 3 uses the original soft buffer, but when the eNB allocates HARQ Process Number 9, it is an indication that subsequent PDSCH transmission is rate matched to a smaller soft buffer size, i.e. HARQ Process Numbers 9, 1, 2 & 4 use the smaller soft buffer size.

In such an embodiment, the following options may be used to handle ongoing HARQ processes (i.e. HARQ processes 1, 2, and 4 in the above example) when a HARQ process number greater than 8 is received:
  The contents of ongoing HARQ processes (1, 2 & 4 in the example above) are discarded;
  Ongoing HARQ processes (1, 2 & 4 in the example above) use the original (larger) soft buffer size until the NDI (new data indicator) for that HARQ process toggles, after which they use the new smaller soft buffer size; and
  The smaller soft buffer is arranged to be a rate matched version of the larger soft buffer (i.e. the physical soft bits that are stored in the smaller soft buffer are a subset of the physical soft bits that are stored in the larger soft buffer). When a smaller soft buffer is activated, the contents of any corresponding larger soft buffer can then be rate matched to the size of the smaller soft buffer.

In another embodiment, the eNB can revert back to using 8 HARQ Processes by indicating a specific bit string in the HARQ Process Number, e.g. "1110". This would mean that the UE would revert back to using the original soft buffer size for the PDSCH. This specific bit string can also implicitly represent a HARQ Process Number. For example, if the UE has been using 10 HARQ Processes, upon receiving this specific bit string, it would mean that the UE would use HARQ Process Number 1 and also repartition its soft buffer to receive 8 HARQ Processes.

In yet another embodiment, only a HARQ Process Number greater than 8 uses a smaller soft buffer and other HARQ Process numbers use the original soft buffer size. In such an embodiment, the eNB is responsible to ensure the UE has sufficient soft buffer memory to contain the $9^{th}$ and $10^{th}$ HARQ Process. One way to accomplish this is to schedule the $9^{th}$ and $10^{th}$ HARQ Process first.

In some embodiments, 4 bits are used to indicate 10 HARQ Processes. For example, the HARQ Process Number 0 to 7 uses the original soft buffer size, i.e. are rate matched without reduction in soft buffer memory, whilst HARQ Process Number 8 to 15 uses rate matching with the reduced soft buffer memory. The UE only needs to store a maximum of 10 HARQ processes at any one time (even though it is possible to signal up to 16 HARQ processes, using 4 bits): this is known to both the UE and the eNodeB according to this application. For example, for a total soft buffer memory capacity in the UE of N_soft bits, the soft buffer sizes of each HARQ process are dimensioned as:
  HARQ processes 0->7: N_soft/8
  HARQ processes 8->15: (N_soft−2*N_soft/8)/8
  For example, if N_soft=25344, then the per-HARQ process soft buffer sizes are:
  HARQ process 0->7: 3168 soft bits
  HARQ process 8->15: 2376 soft bits
  HARQ processes 0 and 1 are always the large size (3168 bits). If the eNB schedules the UE with HARQ process 2, then that uses a large size (3168 bits). However if the eNB schedules with HARQ process 9, that uses the smaller size (2376 bits).

In an embodiment, in order to simplify memory management at the UE, a rule is specified that when the UE is scheduled with one of HARQ process 9->15 and HARQ processes 2->7 are still active, then the contents of HARQ processes 2->7 are discarded. Similarly, when the UE is scheduled with one of HARQ processes 2->7 and HARQ processes 9-15 are still active, the contents of HARQ processes 9->15 are discarded.

Hence, in order to schedule the UE with 8 HARQ processes, HARQ processes 0->7 are used (and they have the larger soft buffer size). In order to schedule the UE with 10 HARQ processes, HARQ processes 0, 1 and 8->15 are used (where processes 0, 1 have the larger soft buffer size and processes 8->15 have the smaller soft buffer size).

It is feasible that the UE may miss the DCI indication and hence fail to repartition its HARQ buffer to the desired number of HARQ Processes. The eNB however, would use the wrong number of HARQ Processes in scheduling for PDSCH. Hence, in another embodiment, when the DCI bit indication to repartition the HARQ buffer (i.e. change the total number of HARQ Processes) is sent, an acknowledgement is expected from the UE. This acknowledgement can be sent using the PUCCH for example four subframes later. This acknowledgement is a separate acknowledgement and can be different to that for the PDSCH (if a PDSCH is transmitted). The acknowledgement could alternatively be sent using a field in the MAC header of the PUSCH: when a UE transmits PUSCH, a single bit field could indicate whether it is using eight or ten HARQ processes for PDSCH.

In another embodiment if a DCI indication to repartition the UE's HARQ buffer is sent, no corresponding PDSCH is sent. That is, the UE would not expect a PDSCH to be sent. Instead, the UE would repartition its HARQ buffer accordingly and then send an acknowledgement.

Figure 11:
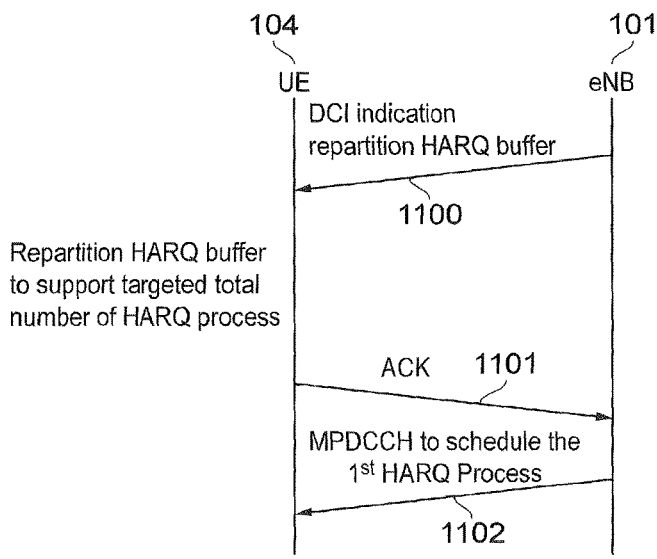
FIG. 11 is a schematic flow diagram illustrating arrangement in which an infrastructure equipment instructs a UE to be repartition its HARQ buffer in accordance with the present technique.

FIG. 11 provides a message flow diagram between the eNB and the UE in accordance with present technique. As shown in FIG. 11 the eNB 101 transmits a DCI indication to the UE 104 providing an indication to the UE to repartition its HARQ buffer to accommodate the two additional HARQ processes. The UE 104 then transmits an ack message 1101 to the eNB 181 and the eNB 101 in response transmits the first PUCCH to schedule the first HARQ process in message 1102. Here the eNB will only send a MPDCCH to the UE after it has received an acknowledgement that the HARQ repartitioning is completed.

In another embodiment after sending the HARQ buffer repartitioning indicator in the DCI to the UE, the eNB would start a timer. The UE is expected to repartition its HARQ buffer for the targeted total number of HARQ processes and send an acknowledgement. If the eNB fails to receive an acknowledgement from the UE then it will assume that the UE has failed to repartition its HARQ buffer. The eNB can then retransmit the DCI indicator. If the UE has already repartitioned its HARQ buffer but the eNB fails to receive the acknowledgement, the UE can resend the acknowledgement after receiving the retransmitted DCI indicator.

In one embodiment, when the HARQ memory is re-partitioned, the contents of the HARQ buffer memory may be flushed.

In another embodiment:
when the HARQ memory is re-partitioned to a smaller size, a portion of the contents of the HARQ buffer are flushed (e.g. when 8 HARQ processes are re-partitioned to 10 HARQ processes, 20% of the contents of the existing HARQ buffers are flushed and the remaining contents are used for re-combining operations).
when the HARQ memory is re-partitioned to a larger size, the contents of the existing HARQ buffers are combined with future re-transmissions.

In another embodiment the HARQ buffer repartitioning indicator is signalled to the UE via RRC signalling. The RRC signalling is automatically acknowledged by the UE as part of RRC signalling.

In another embodiment, when ten HARQ processes operation is used, the eNB encodes the data unit with ½ code rate. The UE would then decode the received PDSCH using a ½ code rate.

In another embodiment, when ten HARQ Processes operation is used, the eNB still encodes the data units with ⅓ code rate but it is rate matched to a smaller HARQ buffer size. That is some of the bits are punctured prior to transmitting to the UE. Some of the remaining bits can be repeated and transmitted in place of the punctured bits. The UE would decode the received PDSCH using ⅓ code rate. The Turbo encoder can recover the punctured bits.

In another embodiment, when ten HARQ Processes operation is used, the eNB encodes the Transport Block with ⅓ code rate and transmits the PDSCH at ⅓ code rate. At the UE after it has performed demodulation of the symbol, it would discard some of the (soft) bits and store the remaining ones in the HARQ buffer (since there would not be sufficient memory to store all the soft bits). The Turbo encoder can recover the discarded bits.

Adapting HARQ Processes when Using Cross Subframe Scheduling

As will be appreciated from the above described embodiments, when cross subframe scheduling is employed, the eNB is configured to increase the number of HARQ processes to compensate for the delay which is imposed between the final HARQ processes of the repeated pattern of subframes and the first HARQ process of the next repeated pattern of subframes. The delay is caused by the time taken for the UE to receive the encoded data unit on the PDSCH and to prepare and to transmit the ACK/NACK on the PUCCH and the time taken for the eNB to decode the PUCCH transmission. As an alternative arrangement, embodiments of the present technique can alternatively or in combination with the embodiments described above compensate for the delay caused by cross subframe scheduling by reducing a time between the PDSCH reception at the UE and the transmission of the related ACK/NACK in the PUCCH (or PUSCH).

Figure 12:
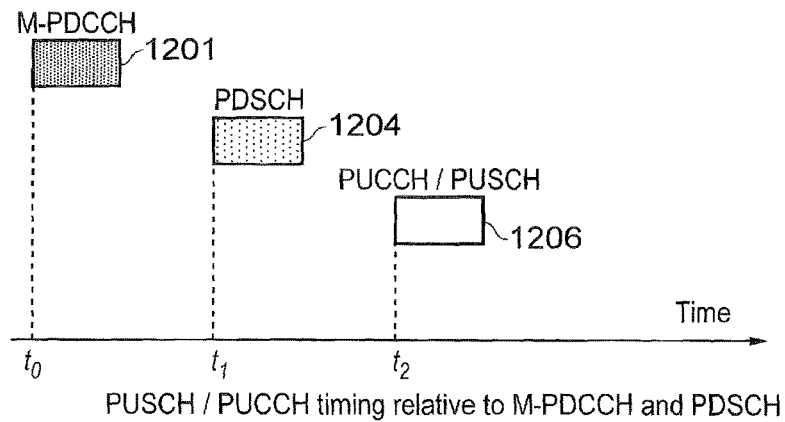
FIG. 12 is an illustrative representation of a timing of transmission of signals on the uplink and the downlink for a HARQ process in accordance with the present technique.
Figure 13:
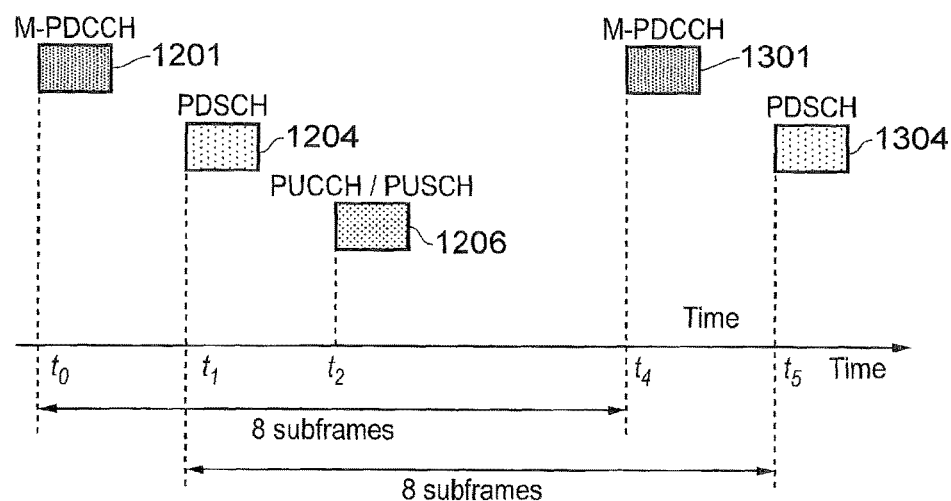
FIG. 13 is another illustrative representation of a timing of transmission of signals on the uplink and the downlink for a HARQ process from an infrastructure equipment in accordance with the present technique.

Example embodiments of the present technique can be appreciated from signal timing diagrams provided by FIGS. 12 and 13. FIG. 12 provides a representation of signals transmitted respectively in the M-PDCCH 1201, the PDSCH 1204 and the PUCCH/PUSCH 1206, which as explained above are required to perform one of the HARQ processes. As shown in FIG. 12, at time $t_0$, the eNodeB transmits a control channel message, allocating resources on the PDSCH 1204, on an M-PDCCH. This M-PDCCH 1201 allocates the PDSCH, using cross-subframe scheduling, at time $t_1$. There is then an implicit, or explicit, allocation of resources for the transmission of HARQ ACK/NACK feeding signalling in the PUCCH (or PUSCH at time $t_2$) 1206. A box 1206 in FIG. 12 represents the transmission of the HARQ ACK/NACK which could be on the PUCCH or the PUSCH.

According to an example embodiment, the transmission of the signals required for the HARQ processes is adapted to be reduced according to the following timings:
M-PDCCH occupies a single subframe
A single subframe exists between M-PDCCH and PDSCH (i.e. $t_1-t_0$=two subframes)
PDSCH occupies a single subframe (in other embodiments, the PDSCH can be truncated)
A single subframe exists between PDSCH and PUCCH/PUSCH (i.e. $t_2-t_0$=two subframes. In the prior art Release-12 timing relationship, $t_2-t_1$=four subframes)
PUCCH or PUSCH occupies a single subframe The whole HARQ timing from the eNodeB perspective is as shown in FIG. 13. The HARQ timing shows that the same HARQ process can be scheduled every 8 subframes, between M-PDCCH transmissions 1201, 1301 or PDSCH transmissions 1204, 1304, the time difference being $t_5-t_1$=8 subframes. This can be compared to the timing diagrams for the alternative embodiments shown in FIGS. 9 and 10 above, where the same HARQ processes are scheduled only every 10 subframes. Thus according to example embodiments of the present technique the transmission and/or reception of the control message allocating communications resources on the shared channel (PDSCH), the encoded data unit on the PDSCH and the ACK/NACK on the PUCCH/PUSCH (HARQ signals) are adapted and in some examples compromised in order to reduce the delay so that a time difference between corresponding HARQ processes in the repeating pattern of subframes is reduced from ten to eight as shown in FIG. 13. The adaption and/or compromise of the transmission/reception of these signals is explained below. Accordingly, the number of HARQ processes required to achieve peak throughput is reduced from ten to eight, thereby maintaining the same number of HARQ processes, which can be used without cross subframe scheduling.

Examples embodiments in which the adaption of the transmission and/or reception of the HARQ signals explained above are provided in the following paragraphs. For example, at the UE, the timing between PDSCH and PUCCH/PUSCH can be reduced to a single subframe. To this end, the following operations need to be performed between over the air reception of PDSCH and over the air transmission of PUCCH/PUSCH.

FFT (Fast Fourier Transform)
Channel estimation
Equalisation
Turbo decoding of PDSCH
PUCCH channel processing
Timing advance of PUCCH It is known that, when decoding M-PDCCH, it is possible to perform the functions of {FFT, channel estimation, equalisation, blind decoding of up to 16 M-PDCCH candidates} well within a single subframe. It is known that in some implementations, these functions are even possible within 2 OFDM symbols (approx. 140 µs).

The M-PDCCH transmits DCI (downlink control information) of up to approximately 27 bits and a 16 bit CRC is appended. Up to 16 blind decodes of M-PDCCH are required. M-PDCCH is coded using a tail biting convolutional code, hence multiple Viterbi decoding iterations are required to decode the M-PDCCH. The total blind decoding load per iteration of the M-PDCCH is hence (27+16) *16=688 bits. This is similar to the Turbo decoding processing load (1024 bits) required to achieve peak data rate. Hence provided the PUCCH channel processing and timing advance of PUCCH do not take an excessive time, the reduced timeline shown in FIG. 13 can be achieved. However, according to UE implementation and capability, it would be advantageous for the UE to be able to spend some extra timing decoding the PDSCH.

Peak rates are most achievable when the UE operates in good SNR conditions. These good SNR conditions are observed in the centre of the cell. If the peak rate is expected to be achieved in the 25% of the cell that is closest to the base station, and assuming a (large) cell radius of 10 km, the maximum timing advance that needs to be applied is less than 35 µs (i.e. less than half an SC-FDMA symbol).

PUCCH channel processing is a simple process consisting of the functions of:
 creation of a base sequence
 scrambling of the base sequence
 multiplication by an orthogonal cover code
 mapping to resource elements that are not occupied by DMRS (demodulation reference signals)

Figure 14:
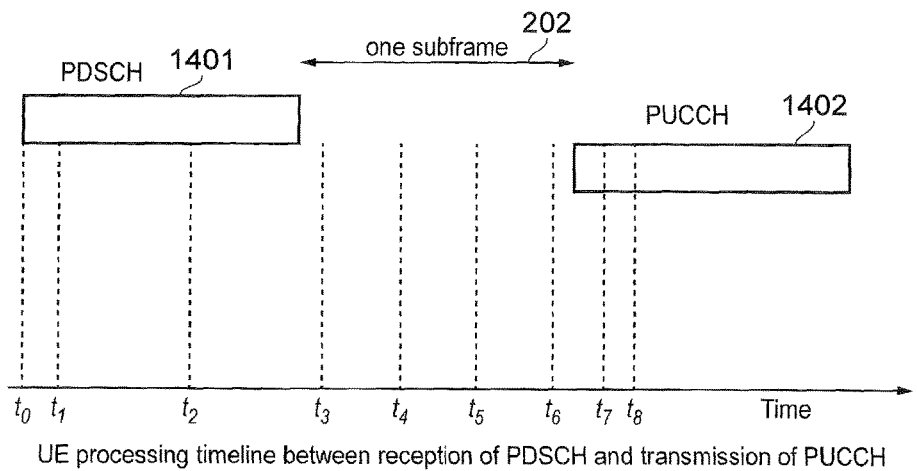
FIG. 14 is an illustrative representation showing a processing timeline at a communications device between reception on a downlink shared channel and transmission on an uplink control channel for a HARQ process.

An example of a UE processing timeline is illustrated in FIG. 14, in which a temporal gap between the transmission of the PDSCH 1401 and the PUCCH 1402 is shown to be one sub-frame 202. The actual processing times used for the different UE functions depends on implementation. This example processing timeline shows that, if the processing timeline can be slightly extended or UE processing functions slightly accelerated, it is feasible to transmit a PUCCH one subframe after the PDSCH that it relates to. Aspects of the present technique relate to slightly extending the processing timeline and accelerating the UE processing functions. In the processing timeline of FIG. 14, the following operations occur:
 t0: start of buffering of over the air samples
 t1: start of FFT operation
 t2: channel estimation operation begins. This operation can begin soon after the first reference signals are received by the UE. The channel estimation can be refined as more reference symbols are received by the UE.
 t3: end of FFT operation
 t4: end of channel estimation operation; start of equalisation (the "equalisation" operation could be replaced by an operation such as maximum likelihood (ML) decoding or soft sphere decoding (SSD)). The time of the end of the channel estimation operation depends on the time location of the last reference signals in the PDSCH
 t5: end of equalisation; start of Turbo decoding of PDSCH
 t6: start of PUCCH channel processing (this time can include the time required for UE software/firmware to determine the ACK/NACK status to be applied in the PUCCH)
 t7-t8: time allocated to timing advance of PUCCH Some examples of achieving the improved timing in accordance with that illustrated in FIG. 14 and explained above such that the time t8 in Figure occurs before the start of the PUCCH 1402 as shown are provided below.

Figure 15:
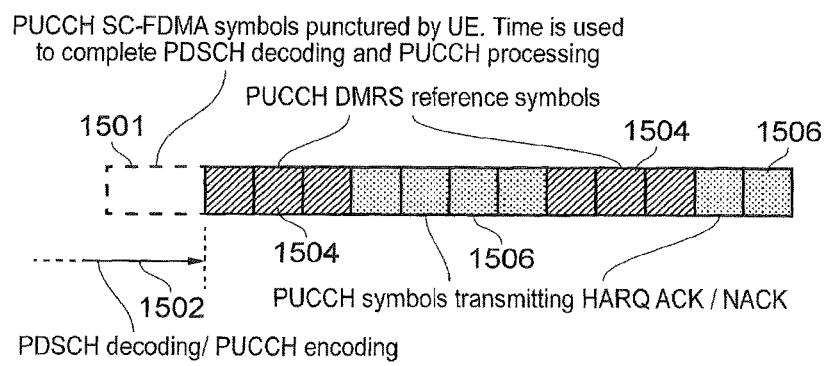
FIG. 15 is an illustrative representation of initial SC-FDMA symbols of an uplink transmission of an ACK/NACK punctured to allow a processing timeline to be met.

In one embodiment, the PUCCH is punctured by the UE as illustrated in FIG. 15. In this case, the PUCCH does not occupy the full 14 SC-FDMA symbols (in normal cyclic prefix) available for PUCCH, and the initial SC-FDMA symbols are not transmitted, as shown by the dashline box 1501. The time for those initial SC-FDMA symbols is used by the UE to complete PDSCH decoding and perform initial PUCCH encoding. There are various possibilities for how the puncturing can be handled by the UE and eNodeB, which are:
 The eNodeB may indicate to the UE the number of SC-FDMA symbols that are to be punctured.
 The eNodeB may simply try to decode the PUCCH without knowledge of which symbol have been punctured, using the inherent resilience of the PUCCH coding to correct the punctured symbols.
 The eNodeB may try to decode the PUCCH using different hypotheses on the number of SC-FDMA symbols that have been punctured by the UE (this is a form of blind decoding).

FIG. 15 shows a PUCCH occupying two slots in a subframe (a slot consisting of 7 SC-FDMA symbols), where the initial symbols 1501 in the first slot of the subframe are punctured. In some cases, the PUCCH is frequency hopped between the first slot and the second slot of the subframe (not shown in FIG. 15).

The PUCCH is typically repeated twice within a subframe, where a PUCCH is transmitted in each slot. Hence in one possible operation of the above embodiment there is only one repetition of the PUCCH and that is transmitted in the $2^{nd}$ slot of the subframe. That is the PUCCH in the $1^{st}$ slot is completely punctured (not transmitted). This would incur a 3 dB loss but since the UE may be in a good radio condition and is not power limited, this can be compensated for (e.g. by increasing the transmit power of the UE). It is noted that increasing the transmit power of the UE does not increase the energy consumption at the UE since the increased transmit power is applied for a shorter period of time.

Figure 16:
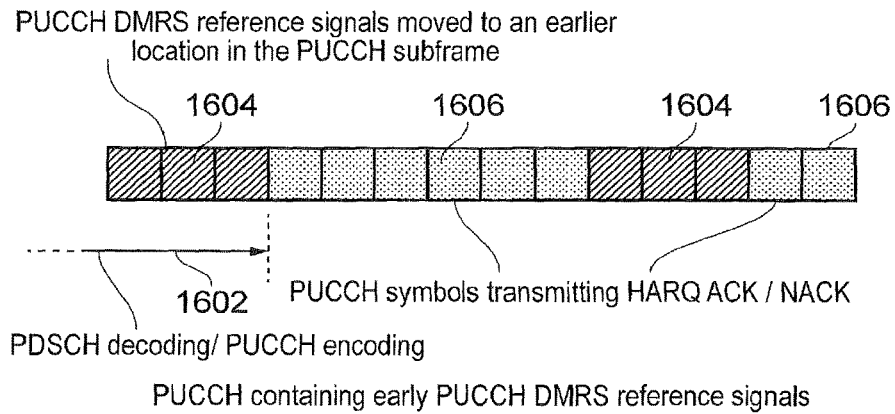
FIG. 16 is an illustrative representation of an uplink transmission of an ACK/NACK containing early reference signals.

In one embodiment, the order of the SC-FDMA symbols (represented by each of the boxes 1504, 1506) used to make up the PUCCH is re-arranged, such that the initial SC-FDMA symbols are occupied by reference signals represented as the hashed boxes 1504. The UE is able to complete processing of the PDSCH transmission and start transmission of these reference signals 1504 before it has determined the ACK/NACK status of the PDSCH. FIG. 16 shows an example PUCCH format where the first set of DMRS reference signals 1604 has been moved earlier in time (and the initial data bearing symbols 1606 have been moved later in time).

Figure 17:
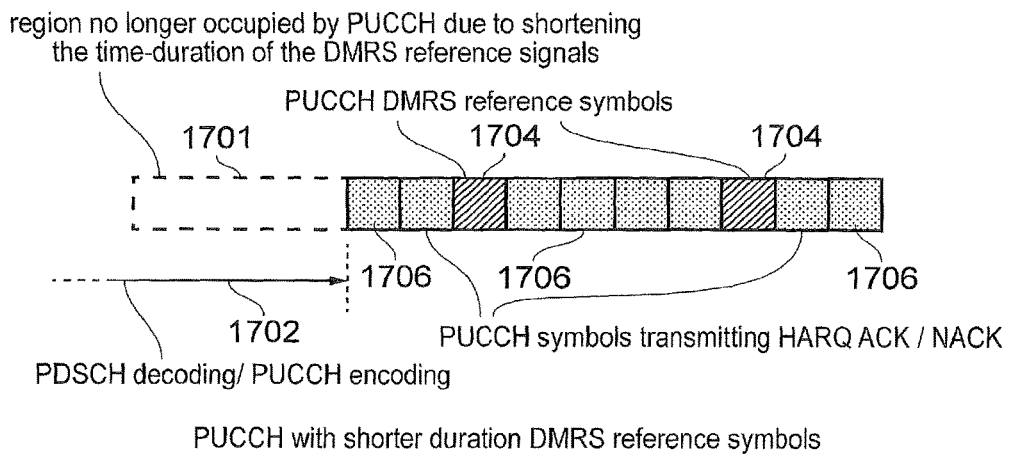
FIG. 17 is an illustrative representation of an uplink transmission of an ACK/NACK with shorter duration reference symbols.

In another embodiment represented in FIG. 17, the duration of the PUCCH DMRS reference signals 1704 is reduced and the PUCCH transmission is delayed as represented by arrow 1702. It is noted that peak downlink data rates are only transmitted to the UE when the UE is in reasonable channel conditions. In these cases, the UE uplink performance is unlikely to be channel estimation limited, hence reducing the number of available reference symbols is not a significant issue. Any loss in performance can be compensated for by transmitting the PUCCH at a higher power.

In the above embodiments where aspects of the PUCCH are truncated (either DMRS 1504, 1604, 1704 or data-bearing symbols 1506, 1606, 1706), the performance loss can be mitigated by applying power control to the PUCCH. Since the eNodeB and UE know when the PUCCH is truncated, the following two methods can be applied:

- eNodeB automatically sends a power control command to the UE when it knows that truncation of the PUCCH will occur.
- UE autonomously increases the PUCCH power under a known scheme (e.g. a scheme defined in the specifications). When the scheme is also known by the eNodeB, the UE is able to autonomously change the PUCCH power and the eNodeB will be expecting a changed receive power (and will be able to handle any concomitant interference created by the UE's increased transmit power).

In another embodiment, the UE terminates reception of the over the air PDSCH early (e.g. by puncturing the last OFDM symbols of the received PDSCH). This allows the UE to start decoding the PDSCH early. This embodiment would be applicable when high order modulations and coding rates are available to the PDSCH (if these are not available, there is not enough physical resource available for the eNodeB to encode a high data rate downlink transmission for the UE). In this embodiment, the eNodeB can either transmit all the symbols of the PDSCH (and the UE chooses to puncture symbols as appropriate) or the eNodeB can transmit a truncated PDSCH, allowing the eNodeB to save transmit power resources, or use those truncated symbols to transmit an additional channel, or additional reference signals. Such additional channels or reference signals can either be transmitted to the UE receiving the PDSCH or to another UE.

To facilitate this embodiment, when transmission modes relying on DMRS are used, it may be advantageous to move the location of the PDSCH DMRS. In conventional arrangements, the PDSCH DMRS at least occupy the last two OFDM symbols of the downlink subframe. These could be moved to earlier OFDM symbols.

Instead of moving the DMRS, the DMRS in the final OFDM symbols of the PDSCH can be punctured and UE demodulation can instead be based on two sets of DMRS (occupying an earlier OFDM symbol).

Instead of using a transmission mode relying on DMRS, the eNodeB can use a CRS (cell-specific reference signal) based transmission mode (where the CRS reference signals occur earlier in the subframe than the DMRS reference signals).

In another embodiment, the UE uses fewer Turbo decoding iterations when peak rates are being scheduled. The UE may transmit an indication to the eNodeB that it is using decreased Turbo iterations since it is advantageous for the eNodeB to know about the operations that the UE is performing in order to stabilize control loops that control the modulation and coding scheme scheduled by the eNodeB.

In another embodiment, the eNodeB uses an error control code that is simpler to decode (than a Turbo code) when peak rate formats are being applied. For example the eNodeB could use a convolutional code or block code (e.g. LDPC/Low Density Parity Check code) when peak rate formats are being applied.

The UE could be informed of the error control code being applied through the DCI indication. E.g. certain modulation and coding schemes (MCS) could be associated with a simpler error control code.

In some embodiments RRC signaling is used to indicate that the time between PDSCH transmission and the associated PUCCH is reduced.

In some embodiments, DCI signaling is used to indicate that the time between PDSCH transmission and the associated PUCCH is reduced.

In some embodiments, a reduced time between PDSCH transmission and associated PUCCH is applied when the PDSCH transport block size exceeds a threshold.

In some embodiments, a reduced time between PDSCH transmission and associated PUCCH is applied when the PDSCH is not repeated between subframes (i.e. the UE is not operating in a coverage enhancement mode).

In the above examples, the ACK/NACK feedback is carried using the PUCCH, but as indicated above the ACK/NACK could be carried by the PUSCH. Example embodiments which use the PUSCH to transmit the ACK/NACK will now be described.

The PUCCH carries Uplink Control Information (UCI). The UCI can be transmitted on either PUCCH or PUSCH. When transmitted on PUSCH, the UCI is "piggybacked" on the PUSCH. The piggybacked UCI occupies some known resource element locations around the PUSCH DMRS reference symbols.

Figure 18:
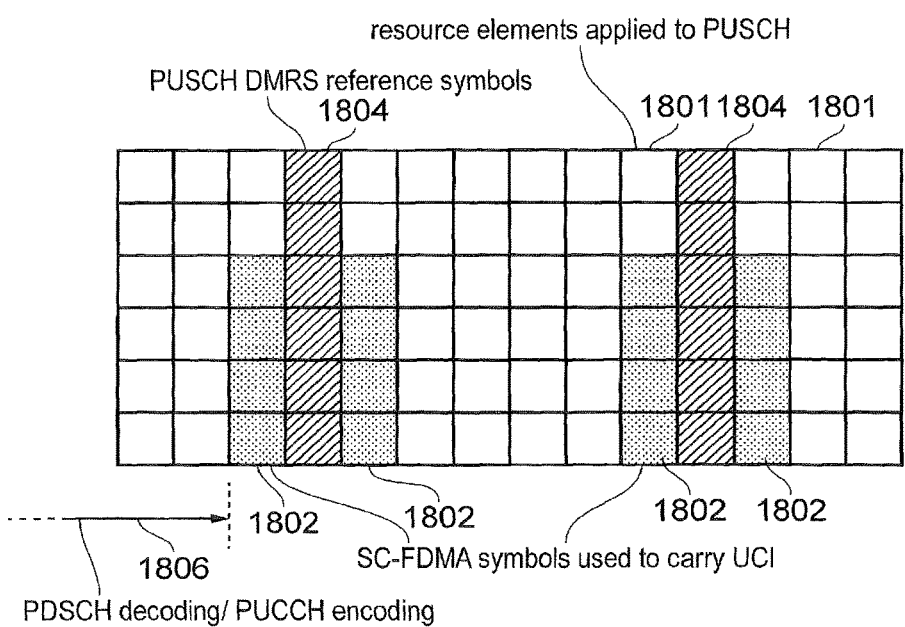
FIG. 18 is an illustrative representation of locations of resource elements applied to indicate an ACK/NACK when piggybacked onto an uplink shared channel.

In some example embodiments, PUSCH is always used, instead of PUCCH when the timeline between PDSCH and UCI is reduced. This facilitates reducing the processing timeline since the piggybacked UCI carried on PUSCH starts at a later SC-FDMA symbol than the first SC-FDMA symbol used when PUCCH is applied. The location of the piggybacked UCI and the extra symbols available for PDSCH decoding and PUCCH encoding according to this embodiment are shown in FIG. 18 (an example mapping is shown and others are possible).

Figure 19:
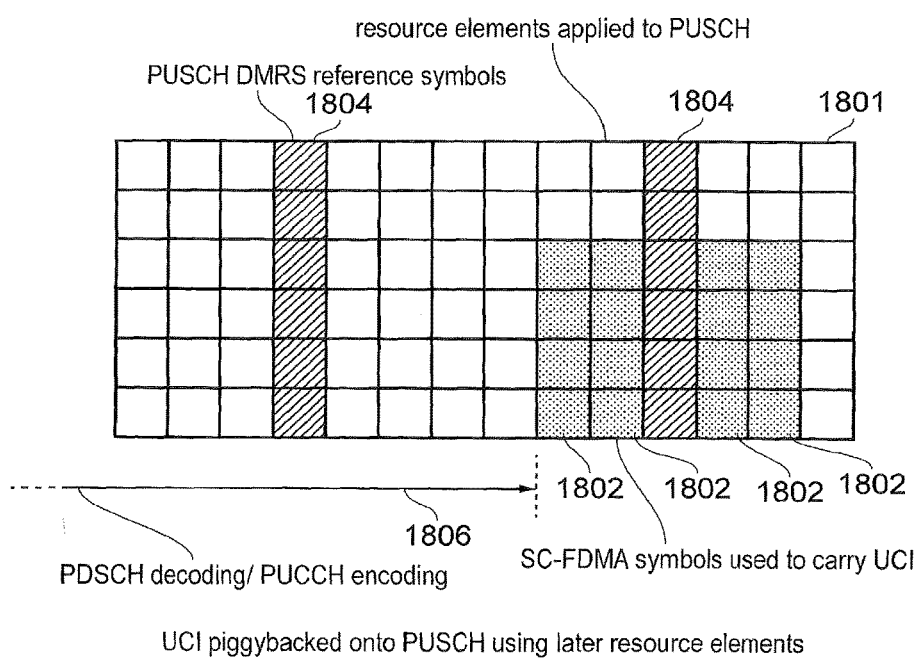
FIG. 19 is an illustrative representation of an ACK/NACK piggybacked onto an uplink shared channel using later resource elements than those use in conventional arrangements.

In other example embodiments, the resource elements used for UCI piggybacked onto PUSCH are moved to later resource elements than those used in the current LTE system, as shown in FIG. 19.

In the above embodiments, "puncturing" is used to describe a process of shortening HARQ signal transmissions. However in other examples instead of puncturing the existing specified PUCCH, a new PUCCH format can be used that directly maps to the available number of resource elements for the shorter time duration PUCCH. In this case, it is preferable that the eNodeB has knowledge of the format of the shorter-time duration PUCCH used by the UE.

Various further aspects and features of the present invention are defined in the following numbered paragraphs:

Paragraph 1. An infrastructure equipment for transmitting data to or receiving data from one or more communications devices in a wireless communications network, the infrastructure equipment comprising:

a transmitter configured to transmit signals to the one or more communications devices via a wireless access interface, a receiver configured to receive signals from one or more of the communications devices via the wireless access interface, the wireless access interface providing communications resources arranged in time divided units of a carrier frequency bandwidth providing a plurality of blocks of communications resources, each of the time divided units comprising on a downlink of the wireless access interface a control channel for transmitting control channel messages and a shared channel, the control channel message allocating communications resources of the shared channel to the communications devices to receive the signals from the one or more infrastructure equipment, and a controller configured with the receiver and transmitter to transmit data, as a plurality of data units, to one of the communications devices, each data unit being encoded for transmission in accordance with a repeat request-type process, the encoding providing an indication of whether the data has been received correctly by the communications device, each of the data units being transmitted in one of a repeating pattern of a first number of time divided units according to a separately controlled repeat request-type process, wherein the transmitter is configured to transmit a control message allocating resources of the shared channel for receiving a data unit of a repeat request-type process which is one or more time divided units after a time divided unit in which the control message is transmitted, and the number of repeat request-type processes in the repeating pattern of time divided units is increased from a first number in the first mode to a second number in the second mode.

Paragraph 2. An infrastructure equipment according to paragraph 1, wherein the second number is increased with respect to the first number by one or more repeat request-type processes which is less than or equal to the number of time divided units, which separates the control channel message from the time unit in which the resources of the shared channel are allocated.

Paragraph 3. An infrastructure equipment according to paragraph 1, wherein the second number is increased with respect to the first number by the number of time divided units, which separates the control channel message from the time unit in which the resources of the shared channel are allocated.

Paragraph 4. An infrastructure equipment according to paragraph 1, 2 or 3, wherein the controller is configured with the transmitter and the receiver to transmit a control signal to the communications device indicating that the infrastructure equipment will transmit data to the communications device using the second number of repeat request-type processes with the second number of repeating consecutive time-divided units, and to adapt the encoding of the data units in accordance with a receiver buffer in the communications device having a predetermined maximum size, the predetermined size being determined to receive the first number of encoded data units of the first number of repeat request-type processes.

Paragraph 5. An infrastructure equipment according to paragraph 4, wherein the controller is configured with the transmitter to increase a coding rate used for the second number of repeat request-type processes with respect to the coding rate used for the first number of repeat request-type processes in accordance with the increase in the number of repeat request-type processes which are used in the second pattern of repeating sub-frames with respect to the first number of repeat request-type processes, so that the data can be received by the communications device within the predetermined maximum buffer size which is configured with respect to the first number of repeat request-type processes.

Paragraph 6. An infrastructure equipment according to paragraph 5, wherein the controller is configured to use the second number of repeat request-type processes for the communications device when radio quality measurements indicate that radio communications conditions are sufficient to allow an increase in the coding rate.

Paragraph 7. A method of transmitting data from an infrastructure equipment to a communications devices in a wireless communications network, the method comprising transmitting data, as a plurality of data units, to the communications device, each data unit being encoded for transmission in accordance with a repeat request-type process, the encoding providing an indication of whether the data has been received correctly by a communications device, each of the data units being transmitted in one of a repeating pattern of a first number of time divided units of a carrier frequency bandwidth providing a plurality of blocks of communications resources of a wireless access interface according to a separately controlled repeat request-type process, each of the time divided units comprising a control channel for transmitting control channel messages and a shared channel, the control channel message allocating communications resources of the shared channel to the communications devices to receive the signals from the one or more infrastructure equipment, wherein the transmitting comprises transmitting a control message allocating resources of the shared channel for receiving a data unit of a repeat request-type process which is one or more time divided units after a time divided unit in which the control message is transmitted, and the number of repeat request-type processes in the pattern of time divided units is increased from the first number to a second number.

Paragraph 8. A communications device for transmitting data to or receiving data from a wireless communications network, the communications device comprising:

a transmitter configured to transmit signals to one or more infrastructure equipment of the wireless communications network via a wireless access interface, a receiver configured to receive signals from one or more of the infrastructure equipment of the wireless communications network via the wireless access interface, the wireless access interface providing communications resources arranged in time divided units of a carrier frequency bandwidth providing a plurality of blocks of communications resources, each of the time divided units comprising on a downlink of the wireless access interface a control channel for receiving control channel messages and a shared channel, the control channel message allocating communications resources of the shared channel to the communications device to receive the signals from the one or more infrastructure equipment, and a controller configured with the receiver and transmitter to receive data from the one or more infrastructure equipment, as a plurality of data units, each data unit having been encoded for transmission in accordance with a repeat request-type process, the encoding providing an indication of whether the data has been received correctly, the data units being received from the one or more infrastructure equipment in one of a repeating pattern of a first number of time divided units, each data unit being received in one of the repeating pattern of data units according to a separately controlled repeat request-type process, wherein the receiver is configured to receive the control message allocating resources of the shared channel for receiving the data unit of the repeat request-type process which is one or more time divided units after a time divided unit in which the control message is received, and the first number of repeat request-type processes in the repeating pattern of time divided units is increased to a second number.

Paragraph 9. A communications device according to paragraph 8, wherein the second number is increased with respect to the first number by one or more repeat request-type processes the number being less than or equal to the number of time divided units, which separates the control channel message from the time unit in which the resources of the shared channel are allocated.

Paragraph 10. A communications device according to paragraph 8, wherein the second number is increased with respect to the first number by the number of time divided units, which separates the control channel message from the time unit in which the resources of the shared channel are allocated.

Paragraph 11. A communications device according to paragraph 8, 9 or 10, wherein the receiver includes a buffer having a predetermined maximum size, the predetermined size being determined to receive the first predetermined number of encoded transport blocks of the HARQ processes, and in the second mode of operation the transport blocks are encoded with an effect that the total size of the encoded transport blocks of the second number of HARQ processes is less than the predetermined maximum size.

Paragraph 12. A communications device as claimed in any of claims 8 to 11, wherein the controller is configured with the transmitter and the receiver to use the second number of repeat request-type processes in response to a control signal received from the one or more infrastructure equipment.

REFERENCES

[1] LTE for UMTS: OFDMA and SC-FDMA Based Radio Access, Harris Holma and Antti Toskala, Wiley 2009, ISBN 978-0-470-99401-6.

Annex 1:

As shown in FIG. 4, each LTE uplink sub-frame may include a plurality of different channels, for example a physical uplink communications channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink sub-frames may also include reference signals. For example, demodulation reference signals (DMRS) 307 and sounding reference signals (SRS) 308 may be present in an uplink sub-frame where the DMRS occupy the fourth symbol of a slot in which PUSCH is transmitted and are used for decoding of PUCCH and PUSCH data, and where SRS are used for uplink channel estimation at the eNodeB. The ePDCCH channel carries similar control information (DCI) as the PDCCH, but the physical aspects of PDCCH are different to those of ePDCCH, as discussed elsewhere herein. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNodeB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink sub-frames, uplink sub-frames have a different control structure to downlink sub-frames, in particular the upper 309 and lower 310 subcarriers/frequencies/resource blocks of an uplink sub-frame are reserved for control signaling rather than the initial symbols of a downlink sub-frame. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulated in combination and therefore if efficient use of the available resources are to be made contiguous frequency allocations for each UE are preferable.

The invention claimed is:

1. An infrastructure equipment for transmitting data to or receiving data from one or more communications devices in a wireless communications network, the infrastructure equipment comprising:
  a transmitter configured to transmit signals to the one or more communications devices via a wireless access interface,
  a receiver configured to receive signals from one or more of the communications devices via the wireless access interface, the wireless access interface providing communications resources arranged in time divided units of a carrier frequency bandwidth providing a plurality of blocks of communications resources, each of the time divided units comprising on a downlink of the wireless access interface a control channel for transmitting control channel messages and a shared channel, the control channel message allocating communications resources of the shared channel to the communications devices to receive the signals from the one or more infrastructure equipment, and a controller configured with the receiver and transmitter to transmit data, as a plurality of data units, to one of the communications devices, each data unit being encoded for transmission in accordance with a repeat request-type process, the encoding providing an indication of whether the data has been received correctly by the communications device, each of the data units being transmitted in one of a repeating pattern of a first number of time divided units according to a separately controlled repeat request-type process, wherein the transmitter is configured to transmit a control message allocating resources of the shared channel for receiving a data unit of a repeat request-type process which is one or more time divided units after a time divided unit in which the control message is transmitted, and the number of repeat request-type processes in the repeating pattern of time divided units is increased from a first number in the first mode to a second number in the second mode.

2. The infrastructure equipment as claimed in claim 1, wherein the second number is increased with respect to the first number by one or more repeat request-type processes which is less than or equal to the number of time divided units, which separates the control channel message from the time unit in which the resources of the shared channel are allocated.

3. The infrastructure equipment as claimed in claim 1, wherein the second number is increased with respect to the first number by the number of time divided units, which separates the control channel message from the time unit in which the resources of the shared channel are allocated.

4. The infrastructure equipment as claimed in claim 1, wherein the controller is configured with the transmitter and the receiver to transmit a control signal to the communications device indicating that the infrastructure equipment will transmit data to the communications device using the second number of repeat request-type processes with the second number of repeating consecutive time-divided units, and to adapt the encoding of the data units in accordance with a receiver buffer in the communications device having a predetermined maximum size, the predetermined size being determined to receive the first number of encoded data units of the first number of repeat request-type processes.

5. The infrastructure equipment as claimed in claim 4, wherein the controller is configured with the transmitter to increase a coding rate used for the second number of repeat request-type processes with respect to the coding rate used for the first number of repeat request-type processes in accordance with the increase in the number of repeat request-type processes which are used in the second pattern of repeating sub-frames with respect to the first number of repeat request-type processes, so that the data can be received by the communications device within the predetermined maximum buffer size which is configured with respect to the first number of repeat request-type processes.

6. The infrastructure equipment as claimed in claim 5, wherein the controller is configured to use the second number of repeat request-type processes for the communications device when radio quality measurements indicate that radio communications conditions are sufficient to allow an increase in the coding rate.

7. A method of transmitting data from an infrastructure equipment to a communications devices in a wireless communications network, the method comprising transmitting data, as a plurality of data units, to the communications device, each data unit being encoded for transmission in accordance with a repeat request-type process, the encoding providing an indication of whether the data has been received correctly by a communications device, each of the data units being transmitted in one of a repeating pattern of a first number of time divided units of a carrier frequency bandwidth providing a plurality of blocks of communications resources of a wireless access interface according to a separately controlled repeat request-type process, each of the time divided units comprising a control channel for transmitting control channel messages and a shared channel, the control channel message allocating communications resources of the shared channel to the communications devices to receive the signals from the one or more infrastructure equipment, wherein the transmitting comprises transmitting a control message allocating resources of the shared channel for receiving a data unit of a repeat request-type process which is one or more time divided units after a time divided unit in which the control message is transmitted, and the number of repeat request-type processes in the pattern of time divided units is increased from the first number to a second number.

8. A communications device for transmitting data to or receiving data from a wireless communications network, the communications device comprising:

a transmitter configured to transmit signals to one or more infrastructure equipment of the wireless communications network via a wireless access interface, a receiver configured to receive signals from one or more of the infrastructure equipment of the wireless communications network via the wireless access interface, the wireless access interface providing communications resources arranged in time divided units of a carrier frequency bandwidth providing a plurality of blocks of communications resources, each of the time divided units comprising on a downlink of the wireless access interface a control channel for receiving control channel messages and a shared channel, the control channel message allocating communications resources of the shared channel to the communications device to receive the signals from the one or more infrastructure equipment, and a controller configured with the receiver and transmitter to receive data from the one or more infrastructure equipment, as a plurality of data units, each data unit having been encoded for transmission in accordance with a repeat request-type process, the encoding providing an indication of whether the data has been received correctly, the data units being received from the one or more infrastructure equipment in one of a repeating pattern of a first number of time divided units, each data unit being received in one of the repeating pattern of data units according to a separately controlled repeat request-type process, wherein the receiver is configured to receive the control message allocating resources of the shared channel for receiving the data unit of the repeat request-type process which is one or more time divided units after a time divided unit in which the control message is received, and a first number of repeat request-type processes in the repeating pattern of time divided units is increased to a second number.

9. The communications device as claimed in claim 8, wherein the second number is increased with respect to the first number by one or more repeat request-type processes the number being less than or equal to the number of time divided units, which separates the control channel message from the time unit in which the resources of the shared channel are allocated.

10. The communications device as claimed in claim 8, wherein the second number is increased with respect to the first number by the number of time divided units, which separates the control channel message from the time unit in which the resources of the shared channel are allocated.

11. The communications device as claimed in claim 8, wherein the receiver includes a buffer having a predetermined maximum size, the predetermined size being determined to receive the first predetermined number of encoded transport blocks of the HARQ processes, and in the second mode of operation the transport blocks are encoded with an effect that the total size of the encoded transport blocks of the second number of HARQ processes is less than the predetermined maximum size.

12. The communications device as claimed in claim 8, wherein the controller is configured with the transmitter and the receiver to use the second number of repeat request-type processes in response to a control signal received from the one or more infrastructure equipment.

13. The communications device as claimed in claim 11, wherein when more than 8 HARQ processes are used, the maximum size of the buffer is reduced and subsequent reception is rate matched to the reduced buffer size.

14. The communications device as claimed in claim 13, wherein when the receiver receives a specific bit string in a HARQ process, the communications device is configured to revert back to using 8 HARQ processes.

15. The communications device as claimed in claim 14, wherein the specific bit string is a HARQ process number.

16. The communications device as claimed in claim 11, wherein
when the communications device is scheduled with a first set of HARQ processes and a second set of HARQ processes are active, the second set of HARQ processes are discarded, and
when the communications device is scheduled with the second set of HARQ processes and the first set of HARQ processes are active, the first set of HARQ processes are discarded.

17. A communications device for transmitting data to or receiving data from a wireless communications network, the communications device comprising:
a transmitter configured to transmit signals to one or more infrastructure equipment of the wireless communications network via a wireless access interface,
a receiver configured to receive signals from one or more of the infrastructure equipment of the wireless communications network via the wireless access interface, the wireless access interface providing communications resources arranged in time divided units of a carrier frequency bandwidth providing a plurality of blocks of communications resources, each of the time divided units comprising on a downlink of the wireless access interface a control channel for receiving control channel messages and a shared channel, the control channel message allocating communications resources of the shared channel to the communications device to receive the signals from the one or more infrastructure equipment, and a controller configured with the receiver and transmitter
to receive data from the one or more infrastructure equipment, as a plurality of data units, each data unit having been encoded for transmission in accordance with a repeat request-type process, the encoding providing an indication of whether the data has been received correctly, the data units being received from the one or more infrastructure equipment in one of a repeating pattern of a first number of time divided units, each data unit being received in one of the repeating pattern of data units according to a separately controlled repeat request-type process, wherein the receiver is configured to receive the control message allocating resources of the shared channel for receiving the data unit of the repeat request-type process which is one or more time divided units after a time divided unit in which the control message is received, and the controller is configured to adapt at least one of the decoding of the data unit, the reception of the encoded data unit or the transmission of an acknowledgement or negative acknowledgement of the repeat request-type process, to reduce a time for transmission of the acknowledgement or the negative acknowledgement to compensate at least partly for the one or more time divided units between the transmission of the control message providing the allocation of the communications resources of the shared channel and the communications resources of the shared channel.

18. The communications device as claimed in claim 17, wherein the adapting the transmission of the acknowledgement or negative acknowledgement includes transmitting the acknowledgement or negative acknowledgement at a later time as a result of reducing a number of repetitions of the acknowledgement of the negative acknowledgement applied.

19. The communication device as claimed in claim 17, wherein the adapting the transmission of the acknowledgement or negative acknowledgement includes transmitting data symbols representing the acknowledgement or negative acknowledgement at a later time as a result of an earlier transmission of reference symbols forming part of the acknowledgement or negative acknowledgement transmission.

20. The communications device as claimed in claim 17, wherein the adapting the transmission of the acknowledgement or negative acknowledgement includes puncturing one or more symbols of the acknowledgement or negative acknowledgement.

21. A communications device for transmitting data to or receiving data from a wireless communications network, the communications device comprising:
a transmitter configured to transmit signals to one or more infrastructure equipment of the wireless communications network via a wireless access interface,
a receiver configured to receive signals from one or more of the infrastructure equipment of the wireless communications network via the wireless access interface, the wireless access interface providing communications resources arranged in time divided units of a carrier frequency bandwidth providing a plurality of blocks of communications resources, each of the time divided units comprising on a downlink of the wireless access interface a control channel for receiving control channel messages and a shared channel, the control channel message allocating communications resources of the shared channel to the communications device to receive the signals from the one or more infrastructure equipment, and a controller configured with the receiver and transmitter to receive data from the one or more infrastructure equipment, as a plurality of data units, each data unit having been encoded for transmission in accordance with a repeat request-type process, the encoding providing an indication of whether the data has been received correctly, the data units being received from the one or more infrastructure equipment in one of a repeating pattern of a first number of time divided units, each data unit being received in one of the repeating pattern of data units according to a separately controlled repeat request-type process, wherein the receiver includes a buffer for buffering the data units received using the repeated request-type processes, the buffer having a predetermined maximum size which is sufficient to accommodate the first number of repeat request-type processes for receiving data units in a first number of repeating consecutive time divided units, to receive a control signal from the infrastructure equipment indicating that the first number of repeat request-type processes using the first number of repeating consecutive time divided units is increased to a second number of repeat request-type processes using a second number of repeating consecutive time divided units, and to adapt the decoding of the encoded data units stored in the buffer in response to the control signal, in accordance with an adaptation which has been applied by the infrastructure equipment to encode the data units so as not to exceed the predetermined maximum buffer size.

22. Circuitry for receiving data at a communications device which is transmitted from an infrastructure equipment of a wireless communications network, the circuitry comprising:

a receiving circuit for receiving data from the infrastructure equipment, as a plurality of data units, each data unit having been encoded for transmission in accordance with a repeat request-type process, the encoding providing an indication of whether the data has been received correctly, each of the data units being received in one of a repeating pattern of a first number of time divided units of a carrier frequency bandwidth providing a plurality of blocks of communications resources of a wireless access interface according to a separately controlled repeat request-type process, each data unit being received in one of the repeating pattern of consecutive data units according to a separately controlled repeat request-type process, wherein the receiving includes receiving the control message allocating resources of the shared channel for receiving the data unit of the repeat request-type process which is one or more time divided units after a time divided unit in which the control message is received, and the first number of repeat request-type processes in the repeating pattern of time divided units is increased to a second number.

23. Circuitry for receiving data at a communications device which is transmitted from an infrastructure equipment of a wireless communications network, the circuitry comprising:

a receiving circuit for receiving data from the infrastructure equipment, as a plurality of data units, each data unit having been encoded for transmission in accordance with a repeat request-type process, the encoding providing an indication of whether the data has been received correctly, each of the data units being received in one of a repeating pattern of a first number of time divided units of a carrier frequency bandwidth providing a plurality of blocks of communications resources of a wireless access interface according to a separately controlled repeat request-type process, each data unit being received in one of the repeating pattern of data units according to a separately controlled repeat request-type process, wherein the receiving includes buffering the data units received using the repeated request-type processes in a buffer, the buffer having a predetermined maximum size which is sufficient to accommodate the first number of repeat request-type processes for receiving data units in the pattern of repeating time divided units, receiving a control signal from the infrastructure equipment indicating that the first number of repeat request-type processes using the pattern of repeating time divided units is increased to a second number of repeat request-type processes using a repeating pattern of a second number of time divided units, and adapting the decoding of the encoded data units stored in the buffer in response to the control signal, in accordance with an adaptation which has been applied by the infrastructure equipment to encode the data units so as not to exceed the predetermined maximum buffer size.

* * * * *